United States Patent
Chiu et al.

(10) Patent No.: US 11,328,056 B2
(45) Date of Patent: *May 10, 2022

(54) SUSPICIOUS EVENT ANALYSIS DEVICE AND RELATED COMPUTER PROGRAM PRODUCT FOR GENERATING SUSPICIOUS EVENT SEQUENCE DIAGRAM

(71) Applicant: CyCarrier Technology Co., Ltd., New Taipei (TW)

(72) Inventors: Ming-Chang Chiu, New Taipei (TW); Hui-Ching Huang, Tainan (TW); Pei Kan Tsung, Taoyuan (TW); Ming Wei Wu, New Taipei (TW)

(73) Assignee: CYCARRIER TECHNOLOGY CO., LTD., New Taipei (TW)

( * ) Notice: Subject to any disclaimer, the term of this patent is extended or adjusted under 35 U.S.C. 154(b) by 327 days.

This patent is subject to a terminal disclaimer.

(21) Appl. No.: 16/548,439

(22) Filed: Aug. 22, 2019

(65) Prior Publication Data

US 2020/0065481 A1 Feb. 27, 2020

Related U.S. Application Data

(60) Provisional application No. 62/721,290, filed on Aug. 22, 2018.

(51) Int. Cl.
*G06F 21/54* (2013.01)
*G06F 21/55* (2013.01)
(Continued)

(52) U.S. Cl.
CPC ............. *G06F 21/54* (2013.01); *G06F 3/14* (2013.01); *G06F 9/542* (2013.01); *G06F 21/552* (2013.01);
(Continued)

(58) Field of Classification Search
CPC ........ G06F 21/54; G06F 9/542; G06F 21/552; G06F 21/554; G06F 21/565; G06F 3/14
See application file for complete search history.

(56) References Cited

U.S. PATENT DOCUMENTS

| | | | | |
|---|---|---|---|---|
| 9,311,479 B1 | * | 4/2016 | Manni | G06F 21/554 |
| 2018/0367541 A1 | * | 12/2018 | Ponnuswamy | H04L 63/101 |
| 2020/0374306 A1 | * | 11/2020 | Dai | H04L 41/145 |

FOREIGN PATENT DOCUMENTS

| | | |
|---|---|---|
| TW | I248322 | 9/2005 |
| TW | 201141155 A | 11/2011 |

OTHER PUBLICATIONS

Google Scholar NPL (Year: 2022).*
(Continued)

*Primary Examiner* — Syed A Zaidi
*Assistant Examiner* — Yasmin Jahir
(74) *Attorney, Agent, or Firm* — Birch, Stewart, Kolasch & Birch, LLP

(57) ABSTRACT

A suspicious event analysis device includes: a display device; a communication circuit, arranged to operably receive multiple suspicious activities records related to multiple computing devices in a target network and corresponding multiple time stamps and multiple attribute tags through internet; a storage circuit, arranged to operably store a suspicious event sequence diagram generating program; and a control circuit, arranged to operably execute the suspicious event sequence diagram generating program to conduct a suspicious event sequence diagram generating operation, so as to identify multiple suspicious events related to the target network as well as multiple time records corresponding to the multiple suspicious events, and to generate and display a suspicious event sequence diagram
(Continued)

corresponding to the multiple suspicious events according to the multiple suspicious events and the multiple time records.

16 Claims, 13 Drawing Sheets

(51) Int. Cl.
  *G06F 21/56* (2013.01)
  *G06F 9/54* (2006.01)
  *H04L 41/14* (2022.01)
  *H04L 29/06* (2006.01)
  *G06F 3/14* (2006.01)
  *G06F 3/0482* (2013.01)

(52) U.S. Cl.
  CPC .......... *G06F 21/554* (2013.01); *G06F 21/565* (2013.01); *H04L 41/14* (2013.01); *H04L 63/1416* (2013.01); *H04L 63/1425* (2013.01); *H04L 63/1441* (2013.01); *G06F 3/0482* (2013.01); *G06F 2203/04803* (2013.01); *H04L 2463/121* (2013.01)

(56) References Cited

OTHER PUBLICATIONS

Taiwanese Notice of Allowance and Search Report dated Mar. 3, 2021 for Application No. 109145061. with an English translation.
Taiwanese Office Action for Taiwanese Application No. 108130110, dated Jul. 2, 2021, with an English translation.

\* cited by examiner

SUSPICIOUS EVENT ANALYSIS DEVICE AND RELATED COMPUTER PROGRAM PRODUCT FOR GENERATING SUSPICIOUS EVENT SEQUENCE DIAGRAM

CROSS-REFERENCE TO RELATED APPLICATIONS

This application claims the benefit of priority to U.S. Provisional Application Ser. No. 62/721,290, filed on Aug. 22, 2018; the entirety of which is incorporated herein by reference for all purposes.

BACKGROUND

The disclosure generally relates to a cyber breach inspection technology and, more particularly, to a suspicious event analysis device and related computer program product for generating suspicious event sequence diagram.

As various internet applications become more common, cyber breach events happen one after the other everywhere. General antivirus software installed in computers can detect and block common viruses; however, they cannot effectively prevent or detect cyber intrusions conducted by hackers. For example, a cyber attacking approach that has become increasingly prevalent in recent years, known as the advanced persistent threat (APT), is a prolonged, advanced, and all-round attack to a specific enterprise or organization. Usually, this kind of cyberattack is a targeted attack sponsored by a specific country or organizations, with a primary purpose of stealing specific information, cryptocurrency, the privacy of specific person, or the like. However, it is difficult for normal security protection software to detect such kind of cyberattack.

Due to the diversity of cyberattack approaches, the current technology cannot yet solely rely on computer programs to make an accurate judgement. In practice, in order to inspect whether a specific environment has been attacked by the aforementioned APT or other types of cyberattack approaches, it is necessary to rely on experienced professional cyber security analysts to collect numerous history records of computer activities from the inspected environment, and to conduct data interpretation and comparison on the collected records so as to make a judgement. However, the aforementioned inspection approach highly relies on the practical experience of the cyber security analysts, and moreover, numerous noise data in the history records of computer activities need to be filtered. Therefore, the whole determining process is considerably labor-intensive and time consuming, and it generally takes several working days to conclude a preliminary judgement.

SUMMARY

An example embodiment of a suspicious event analysis device for diagnosing whether a target network system is breached by hackers is disclosed. The suspicious event analysis device comprises: a display device; a communication circuit, arranged to operably receive multiple suspicious activities records related to multiple computing devices in the target network system, corresponding multiple time stamps, and multiple attribute tags through internet; a storage circuit, arranged to operably store a suspicious event sequence diagram generating program; and a control circuit, coupled with the display device, the communication circuit, and the storage circuit, and arranged to operably execute the suspicious event sequence diagram generating program to conduct a suspicious event sequence diagram generating operation according to the multiple suspicious activities records, the multiple time stamps, and the multiple attribute tags, so as to identify multiple suspicious events with respect to the target network system, identify multiple time records respectively corresponding to the multiple suspicious events, and generate and display a suspicious event sequence diagram corresponding to the multiple suspicious events according to the multiple suspicious events and the multiple time records.

An example embodiment of a computer program product is disclosed. The computer program product is stored in a storage circuit of a suspicious event analysis device, and enables the suspicious event analysis device to conduct a suspicious event sequence diagram generating operation. The suspicious event sequence diagram generating operation comprises: identifying multiple suspicious events with respect to the target network system according to multiple suspicious activities records related to multiple computing devices in a target network system, corresponding multiple time stamps, and multiple attribute tags; identifying multiple time records respectively corresponding to the multiple suspicious events; and generating and displaying a suspicious event sequence diagram corresponding to the multiple suspicious events according to the multiple suspicious events and the multiple time records.

Both the foregoing general description and the following detailed description are examples and explanatory only, and are not restrictive of the invention as claimed.

DETAILED DESCRIPTION

Figure 1:
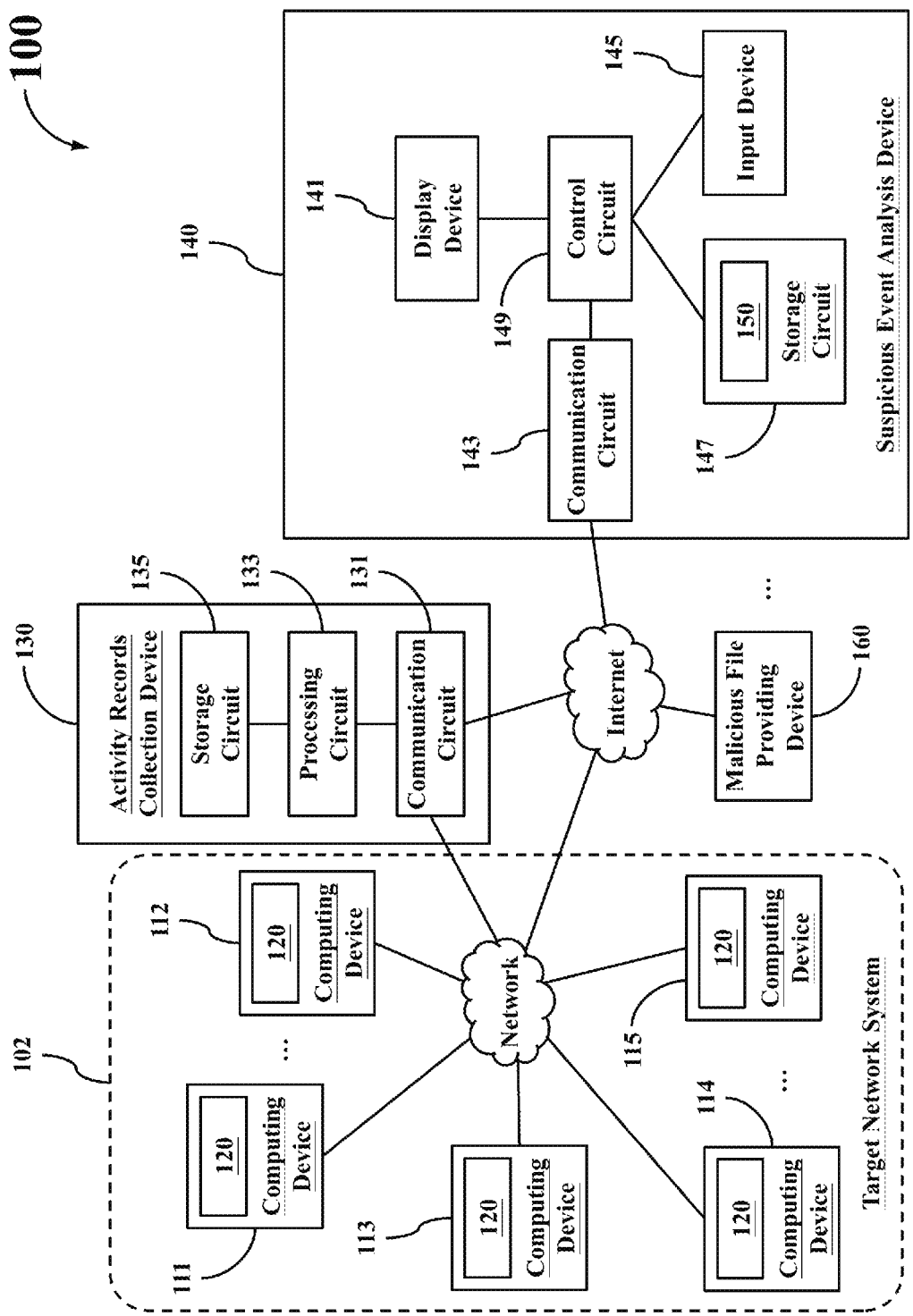
FIG. 1 shows a simplified functional block diagram of a cyber breach diagnostics system according to one embodiment of the present disclosure.

Reference is made in detail to embodiments of the invention, which are illustrated in the accompanying drawings. The same reference numbers may be used throughout the drawings to refer to the same or like parts, components, or operations FIG. 1 shows a simplified functional block diagram of a cyber breach diagnostics system 100 according to one embodiment of the present disclosure. The cyber breach diagnostics system 100 is utilized for diagnosing whether a target network system 102 is breached by hackers. As shown in FIG. 1, the target network system 102 comprises multiple computing devices (e.g., exemplary computing devices 111~115 shown in FIG. 1). Please note that the quantity of the computing devices shown in FIG. 1 is merely for the illustrative purpose, and does not intend to limit the quantity of the computing devices in the target network system 102 to any particular number.

The term "computing device" used throughout the description and the claims refers to various electronic equipment capable of executing specific operating system (e.g., Windows, Linux, macOS, Android, Chrome OS, HarmonyOS, or the like) to operate while supporting appropriate data communication protocols, such as a desktop computer, a laptop computer, a tablet computer, a server, a NAS (network attached storage), a smart television, a smart phone, a smart speaker, or the like. The aforementioned data communication protocols may be various wired transmission protocols or wireless data communication protocols, such as TCP/IP (transmission control protocol/internet protocol) communication protocols, UDP (user datagram protocol) communication protocol, USB (universal serial bus) communication protocols, IEEE 802.11 series communication protocols, Bluetooth series communication protocols, or the like.

In practical applications, the target network system 102 may be an internal network system of enterprises, schools, research institutes, or organizations of various scales, and therefore the quantity of the computing devices of the target network system 102 may be single-digit numbers, dozens, hundreds, or even more than one thousand. In addition, the multiple computing devices of the target network system 102 may be located in a same geographical region, or may be located in different geographical regions (e.g., different cities or countries).

Each computing device in the target network system 102 may directly or indirectly communicate various data with another one or more than one computing devices through appropriate data transmission mechanisms (e.g., an intranet or data transmission cables within the target network system 102). In operations, a part of the computing devices in the target network system 102 may employ wired data transmission approach to conduct data communications, while another part of the computing devices may employ wired data transmission approach to conduct data communications. In other words, different computing devices may employ different data transmission approaches.

In the embodiment of FIG. 1, the cyber breach diagnostics system 100 comprises multiple device activities reporting programs 120, an activity records collection device 130, and a suspicious event analysis device 140.

The multiple device activities reporting programs 120 in the cyber breach diagnostics system 100 are respectively stored and installed in the aforementioned multiple computing devices 111~115 of the target network system 102. The multiple device activities reporting programs 120 are arranged to operably generate multiple suspicious activities records and multiple time stamps related to the multiple computing devices 111~115, and to operably create multiple attribute tags respectively corresponding to the multiple suspicious activities records.

The activity records collection device 130 comprises a communication circuit 131, a processing circuit 133, and a storage circuit 135. The communication circuit 131 is coupled with the target network system 102, and arranged to operably conduct data communications with the aforementioned multiple computing devices 111~115 through appropriate network connections (e.g., an intranet of the target network system 102 or the internet), so as to receive the multiple suspicious activities records generated by the multiple device activities reporting programs 120, the corresponding multiple time stamps, and the corresponding multiple attribute tags. The processing circuit 133 is coupled with the communication circuit 131, and arranged to operably control operations of the communication circuit 131, and to operably process the received multiple suspicious activities records, multiple time stamps, and multiple attribute tags to generate a return data. The processing circuit 133 further utilizes the communication circuit 131 to send the return data to the suspicious event analysis device 140 through appropriate networks (e.g., the internet). The storage circuit 135 is coupled with the processing circuit 133, and arranged to operably store data or files required for operations of the activity records collection device 130.

In practical application, the aforementioned activity records collection device 130 may be installed within the building in which the target network system 102 resides, or may be installed in other location outside the building in which the target network system 102 resides.

As shown in FIG. 1, the suspicious event analysis device 140 comprises a display device 141, a communication circuit 143, an input device 145, a storage circuit 147, and a control circuit 149. The display device 141 is utilized to display various data and images. The communication circuit 143 is arranged to operably receive the aforementioned return data through appropriate networks (e.g., the internet). The input device 145 is arranged to operably enable users of the suspicious event analysis device 140 (e.g., cyber security analysts) to conduct various manipulations on the suspicious event analysis device 140, such as inputting commands, modifying related analyzing parameters, adjusting related data comparison criteria, or adjusting the size, position, or contents of images displayed by the display device 141, or the like. The storage circuit 147 is arranged to operably store a suspicious event sequence diagram generating program 150. The control circuit 149 is coupled with the display device 141, the communication circuit 143, the input device 145, and the storage circuit 147, and arranged to operably extract the multiple suspicious activities records related to the multiple computing devices 111~115 of the target network system 102, the corresponding multiple time stamps, and the corresponding multiple attribute tags from the return data received by the communication circuit 143. The control circuit 149 is further arranged to operably execute the suspicious event sequence diagram generating program 150 to conduct a suspicious event sequence diagram generating operation according to the aforementioned multiple suspicious activities records, multiple time stamps, and multiple attribute tags. In the suspicious event sequence diagram generating operation, the control circuit 149 identifies multiple suspicious events with respect to the target network system 102, identifies multiple time records respectively corresponding to the multiple suspicious events, and generates a suspicious event sequence diagram corresponding to the multiple suspicious events according to the multiple suspicious events and the multiple time records. On the other hand, the control circuit 149 also utilizes the display device 141 to display the resulting suspicious event sequence diagram.

In addition, the exemplary malicious file providing device 160 of FIG. 1 denotes one of the phishing websites, zombie computers, network servers for spreading malicious program codes, or other device entities playing similar roles that may be employed by the hackers in breaching the target network system 102. In actual cyber breach events, the hackers may attempt to attack the target network system 102 by employing more than one malicious file providing devices.

In practice, each of the aforementioned communication circuit 131 and 143 may be realized with various wired transmission circuits, wireless transmission circuits, or a hybrid circuit integrating the aforementioned two communication mechanisms. The processing circuit 133 may be realized with one or more processor units. The storage circuit 135 and 147 may be realized with various non-volatile storage devices. The display device 141 may be realized with various monitors or projection devices capable of displaying images. The input device 145 may be realized with a keyboard, a mouse, a remote control, a touch screen, a touch panel, buttons, a voice-activated input device, a gesture sensing device, a circuit using other various command generating technologies, or a combination of the aforementioned devices. The control circuit 149 may be realized with a single processor module, a combination of multiple processor modules, a computer system, a server, or a cloud system. In addition, the aforementioned display device 141 and the input device 145 may be collectively integrated into a single touch screen or a combination of multiple touch screens.

Figure 2:
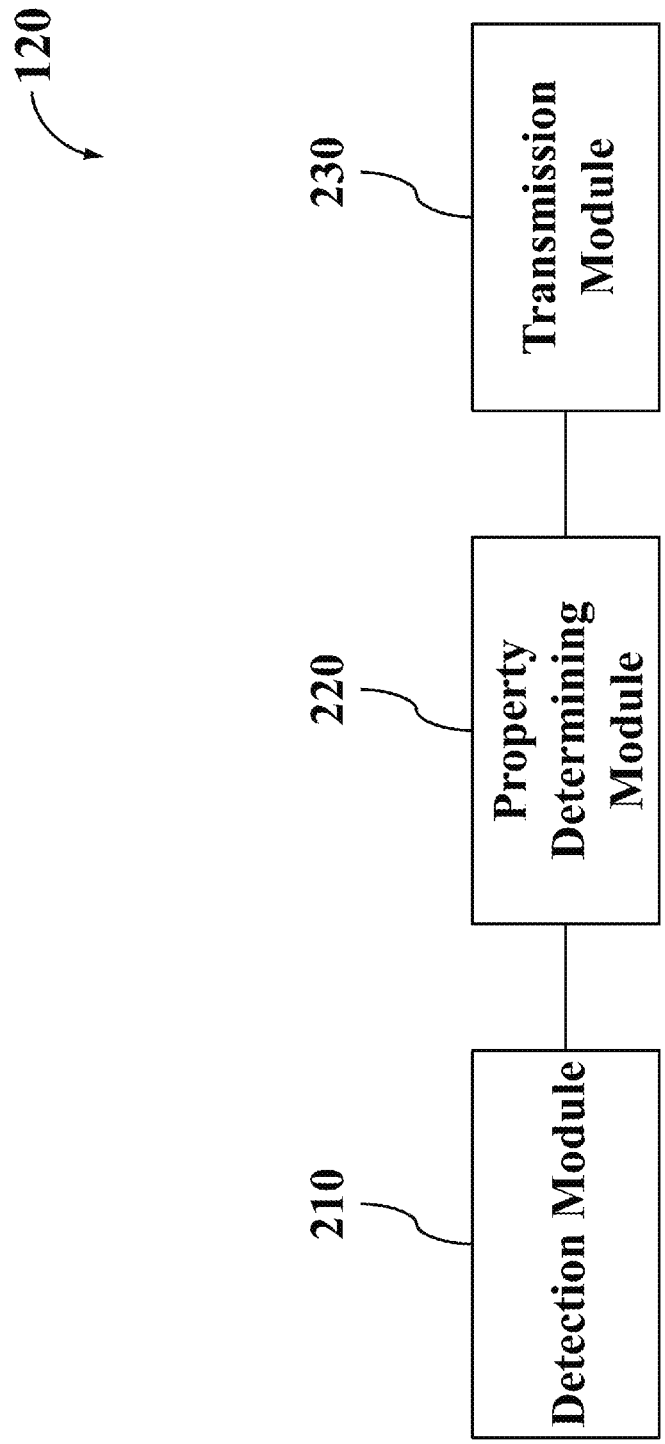
FIG. 2 shows a simplified schematic diagram of functional modules of a device activities reporting program installed in respective computing devices in FIG. 1 according to one embodiment of the present disclosure.

Each of the aforementioned device activities reporting programs 120 stored in different computing devices of the target network system 102 may be realized with a computer program product formed by one or more functional modules. For example, FIG. 2 shows a simplified schematic diagram of functional modules of the device activities reporting program 120 installed in respective computing devices in FIG. 1 according to one embodiment of the present disclosure. In the embodiment of FIG. 2, the device activities reporting program 120 comprises a detection module 210, a property determining module 220, and a transmission module 230.

Figure 3:
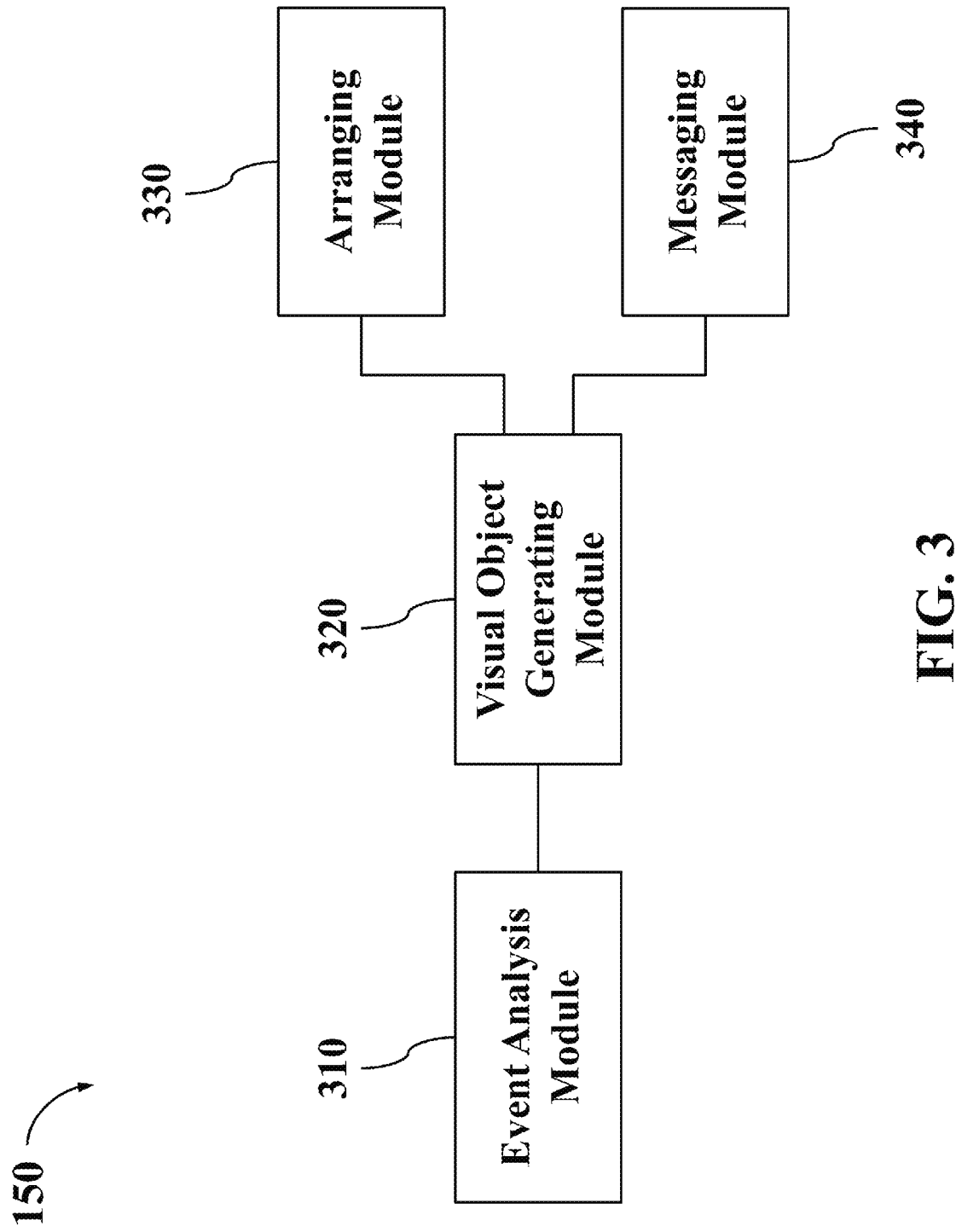
FIG. 3 shows a simplified schematic diagram of functional modules of a suspicious event sequence diagram generating program installed in a suspicious event analysis device in FIG. 1 according to one embodiment of the present disclosure.

In addition, the aforementioned suspicious event sequence diagram generating program 150 stored in the storage circuit 147 of the suspicious event analysis device 140 may be realized with a computer program product formed by one or more functional modules. For example, FIG. 3 shows a simplified schematic diagram of functional modules of the suspicious event sequence diagram generating program 150 installed in the suspicious event analysis device 140 in FIG. 1 according to one embodiment of the present disclosure. In the embodiment of FIG. 3, the suspicious event sequence diagram generating program 150 comprises an event analysis module 310, a visual object generating module 320, an arranging module 330, and a messaging module 340.

Figure 4:
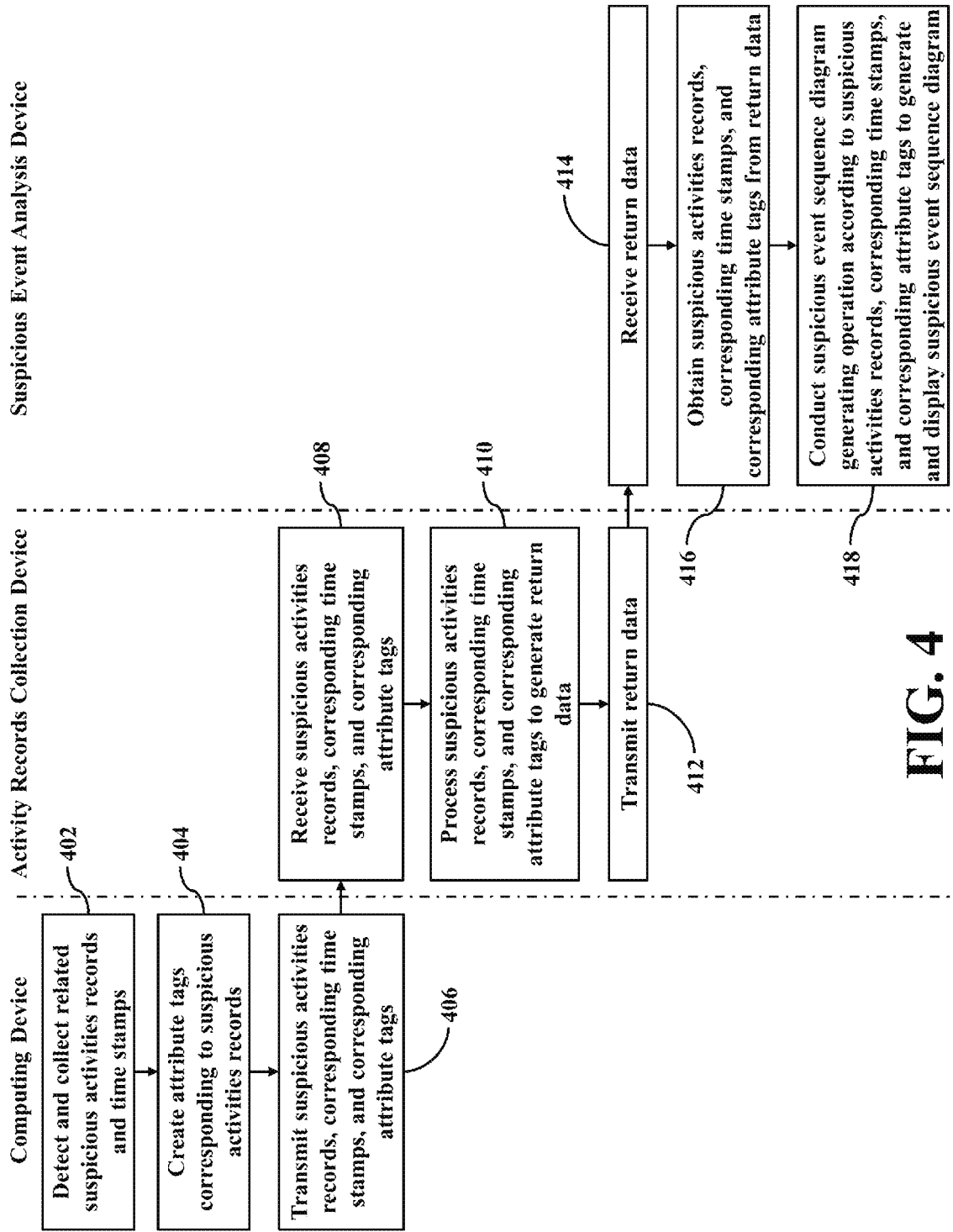
FIG. 4 shows a simplified flowchart of a method for diagnosing whether a target network system is breached by hackers according to one embodiment of the present disclosure.

The operations of the cyber breach diagnostics system 100 will be further described below by reference to FIG. 4. FIG. 4 shows a simplified flowchart of a method for diagnosing whether a target network system 102 is breached by hackers according to one embodiment of the present disclosure.

In the flowchart of FIG. 4, operations within a column under the name of a specific device are operations to be performed by the specific device. For example, operations within a column under the label "computing device" are operations to be performed by respective computing devices 111~115 in the target network system 102; operations within a column under the label "activity records collection device" are operations to be performed by the activity records collection device 130; and operations within a column under the label "suspicious event analysis device" are operations to be performed by the suspicious event analysis device 140.

During the routing operations of the aforementioned target network system 102, respective computing devices execute the device activities reporting programs 120 installed therein to conduct the operations 402 through 406 in FIG. 4.

In the operation 402, the detection module 210 of the device activities reporting program 120 detects and collects the suspicious activities records and the time stamps related to the computing device in which it is installed. For the convenience of description, the computing device 111 is taken as an example for description in the following.

The device activities reporting program 120 installed in the computing device 111 may utilize the detection module 210 to access and analyze the contents of specific non-volatile data in the computing device 111, such as the system logs, the processes which are automatically executed after boot up, the file execution records, and/or the meta data of files of specific types or the like, in the operation 402.

For example, in the case that the operating system of the computing device 111 is the Windows system, the detection module 210 may access and analyze the Windows Event Logs, the Autorun Registry Schedule Jobs, the Prefetch cache, the Shimcache and/or the Amcache, and/or the meta data of PE files (portable executable files) of .exe/.dll/.sys formats, or the like stored in the computing device 111.

For another example, in the case that the operating system of the computing device 111 is the Linux system, the detection module 210 may access and analyze the log items under "/var/log/" directory, the Systemd, the SysV init script, the crontab, the Upstart, the dynamic web pages of .php or .jsp format, the shell scripts, the sensitive files, the command histories, the syslog, and/or the meta data of the ELF files (executable and linkable format files) of .so/.ko formats, or the like stored in the computing device 111.

For yet another example, in the case that the operating system of the computing device 111 is the macOS system, the detection module 210 may access and analyze the log items under "/var/log/" directory, the records under "/Library/LaunchAgents/" directory, the records under "/Library/LaunchDaemons/" directory, the shell scripts, the command histories, and/or the meta data of the Mach-O files (Mach object files), or the like stored in the computing device 111.

In addition to the aforementioned non-volatile data, the detection module 210 may detect and analyze the contents of specific volatile data of the computing device 111 in the operation 402, such as the current contents of the memory of the computing device 111 and/or the network activities of the computing device 111. For example, the detection module 210 may utilize a network connection inquiry command "netstat" to inquire the status of the computing device 111 regarding the connection with external networks, and may utilize various approaches to detect the IP addresses accessed by the computing device 111 as well as the operating situations of the network ports of the computing device 111.

In operations, the detection module 210 may adopt various filtering and determination algorithms to conduct a preliminary analysis on the contents of the aforementioned specific non-volatile data and/or volatile data related to the computing device 111, so as to filter activities records possibly associated with cyber breach events from numerous activities records of the computing device 111 to be suspicious activities records, thereby reducing the data volume to be processed or analyzed by the activity records collection device 130 and the suspicious event analysis device 140 in the subsequent stage.

In practical applications, the suspicious activities records determined by the detection module 210 may comprise historical records of various types, such as file execution activities, file creation activities, file editing activities, networking activities, keystroke logging activities, password stealing activities, credential dumping activities, code injection activities, code manipulation activities, and/or executable code accessing activities, or the like related to the computing device 111.

The substantial physical meanings of the suspicious activities records may be appreciated from their names, and the detailed definitions of respective suspicious activities records are determined by the record detection rules of the detection module 210. Under different detection rules, the same suspicious activities record may have slightly different specific definitions.

In addition, when the detection module 210 determines that a specific activities record is a suspicious activities record, the detection module 210 would also record a time stamp in the computing device 111 with respect to the specific activities record to be a corresponding time stamp of the specific suspicious activities record.

In practice, the detection module 210 of the device activities reporting program 120 may conduct, in real time, the aforementioned operation 402 during the operation of the computing device 111, or may intermittently or periodically conduct the aforementioned operation 402.

In the operation 404, the property determining module 220 of the device activities reporting program 120 may create the attribute tags corresponding to the suspicious activities records according to the analysis results of the detection module 210 with respect to the suspicious activities records.

For example, for the suspicious activities records been determined by the detection module 210 as being related to the malicious program family used by known APT attacks, the property determining module 220 may set a corresponding tag "APT Malware" for such suspicious activities records.

For another example, for the suspicious activities records been determined by the detection module 210 as being related to the programs which are automatically executed after boot up, the property determining module 220 may set a corresponding tag "Autorun" for such suspicious activities records.

For yet another example, for the suspicious activities records been determined by the detection module 210 as being related to the programs involving in networking activities, the property determining module 220 may set a corresponding tag "Networking" for such suspicious activities records.

For yet another example, for the suspicious activities records been determined by the detection module 210 as being related to the programs or memory contents having the keystroke logging functionality, the property determining module 220 may set a corresponding tag "Keystroke Logging" for such suspicious activities records.

For yet another example, for the suspicious activities records been determined by the detection module 210 as being related to the programs having functionalities of stealing password or credentials, the property determining module 220 may set a corresponding tag "Password Stealer" for such suspicious activities records.

For yet another example, for the suspicious activities records been determined by the detection module 210 as being related to the files having hidden attributes, the property determining module 220 may set a corresponding tag "Hidden Files" for such suspicious activities records.

For yet another example, for the suspicious activities records been determined by the detection module 210 as being related to the executable codes in memory blocks, the property determining module 220 may set a corresponding tag "Executable Code" for such suspicious activities records.

For yet another example, for the suspicious activities records been determined by the detection module 210 as related to suspicious code injections or shellcodes, the property determining module 220 may set a corresponding tag "Code Manipulation" for such suspicious activities records.

For yet another example, for the suspicious activities records been determined by the detection module 210 as being related to the memory contents having characteristics of known malicious programs, the property determining module 220 may set a corresponding tag "Malware" for such suspicious activities records.

For yet another example, for the suspicious activities records been determined by the detection module 210 as being related to the memory contents having functionalities of stealing passwords or credentials, the property determining module 220 may set a corresponding tag "Access Credentials" for such suspicious activities records.

After the property determining module 220 sets the attribute tags, different suspicious activities records may have the same attribute tag, or may have different attribute tags. In addition, the property determining module 220 may set multiple different attribute tags for the same suspicious activities record, and thus different suspicious activities records may have different quantities of attribute tags.

In the operation 406, the transmission module 230 of the device activities reporting program 120 may transmit the suspicious activities records related to the computing device 111, the corresponding time stamps, and the corresponding attribute tags to the activity records collection device 130 through appropriate data transmission approaches.

The device activities reporting program 120 in each of other computing devices 112~115 may individually conduct the operations 402~406 by adopting the aforementioned method, so as to transmit the suspicious activities records of the related computing device, the corresponding time stamps, and the corresponding attribute tags to the activity records collection device 130.

In addition, the multiple device activities reporting programs 120 in the aforementioned multiple computing devices 111~115 may simultaneously perform the aforementioned operations 402~406 in a same predetermined time period, or may independently perform the aforementioned operations 402~406 in different time periods.

As can be appreciated from the foregoing descriptions, the multiple device activities reporting programs 120 in the aforementioned computing devices 111~115 would respectively generate multiple suspicious activities records and multiple time stamps related to the computing devices 111~115, and create multiple attribute tags corresponding to the multiple suspicious activities records.

In the operation 408, the communication circuit 131 of the activity records collection device 130 may receive the multiple suspicious activities records, the corresponding multiple time stamps, and the corresponding multiple attribute tags transmitted from the multiple computing devices 111~115 of the target network system 102 through appropriate network connections (e.g., an intranet of the target network system 102 or the internet).

In the operation 410, the processing circuit 133 of the activity records collection device 130 processes the received multiple suspicious activities records, the corresponding multiple time stamps, and the corresponding multiple attribute tags so as to generate a return data. For example, the processing circuit 133 may conduct various processes, such as data encapsulation, compression, encryption, electronic signature, partitioning, or the like, on the received multiple suspicious activities records, the corresponding multiple time stamps, and the corresponding multiple attribute tags so as to generate a return data in appropriate formats.

In the operation 412, the processing circuit 133 utilizes the communication circuit 131 to transmit the return data to the suspicious event analysis device 140 through an appropriate network (e.g., the internet).

In the operation 414, the communication circuit 143 of the suspicious event analysis device 140 may receive the return data generated by the activity records collection device 130 through an appropriate network (e.g., the internet).

In the operation 416, the control circuit 149 of the suspicious event analysis device 140 processes the received return data so as to obtain the multiple suspicious activities records related to the target network system 102, the corresponding multiple time stamps, and the corresponding multiple attribute tags from the return data. For example, the control circuit 149 may conduct combination, decompression, decryption, verify the electronic signature, or other various processes on the return data so as to extract the aforementioned activities records, time stamps, and attribute tags from the return data.

In the operation 418, the control circuit 149 executes the suspicious event sequence diagram generating program 150 stored in the storage circuit 147 to conduct a suspicious event sequence diagram generating operation according to the aforementioned multiple suspicious activities records, and the corresponding multiple time stamps and multiple attribute tags, so as to generate and display a suspicious event sequence diagram.

Figure 5:
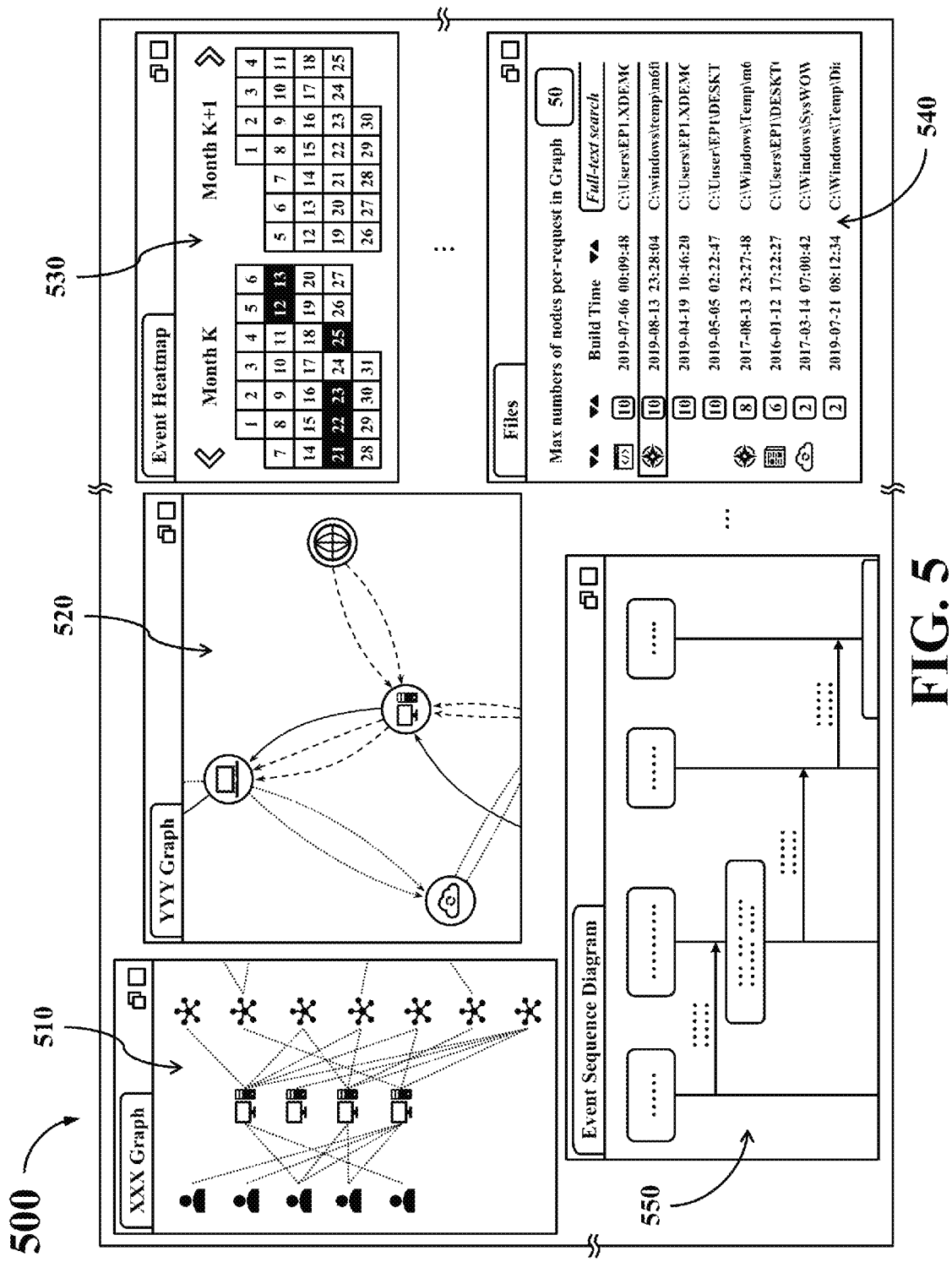
FIG. 5 shows a simplified schematic diagram of an image screen displayed by a display device in FIG. 1 according to one embodiment of the present disclosure.

Please refer to FIG. 5, which shows a simplified schematic diagram of an image screen 500 displayed by the display device 141 of the suspicious event analysis device 140 according to one embodiment of the present disclosure.

In the embodiment of FIG. 5, the image screen 500 displayed by the display device 141 comprises multiple data frames (e.g., the exemplary data frames 510~540 shown in FIG. 5) and a suspicious event sequence diagram 550. Each of the data frames 510~540 in the image screen 500 may be utilized to display various types of text information or graphical information, such as device topology diagrams, device interaction relationship diagrams, statistic graphs, analysis graphs, data sheets, menus, document or file lists, or the like. The suspicious event sequence diagram 550 is utilized to present the image content generated by the aforementioned suspicious event analysis device 140 after executing the suspicious event sequence diagram generating program 150. The contents of the aforementioned data frames 510~540 and the suspicious event sequence diagram 550 may be utilized as judgement basis for the cyber security analysts in diagnosing whether the target network system 102 is breached by hackers or not.

During conducting the diagnosing process, the cyber security analyst may conduct various manipulations through the input device 145 to increase or decrease the quantity of data frames of various types, to adjust the size or position of respective data frames, to modify related analyzing parameters, to issue various commands, or the like.

As can be appreciated from the foregoing descriptions, the multiple computing devices 111~115 in the target network system 102 may transmit the related suspicious activities records, the time stamps, and the multiple attribute tags to the activity records collection device 130, then the activity records collection device 130 accordingly generates the return data and transmits to the suspicious event analysis device 140. This approach is beneficial in reducing outbound networking bandwidth requirement of the target network system 102, and is also beneficial in enhancing the security of data transmission between the activity records collection device 130 and the suspicious event analysis device 140.

Figure 6:
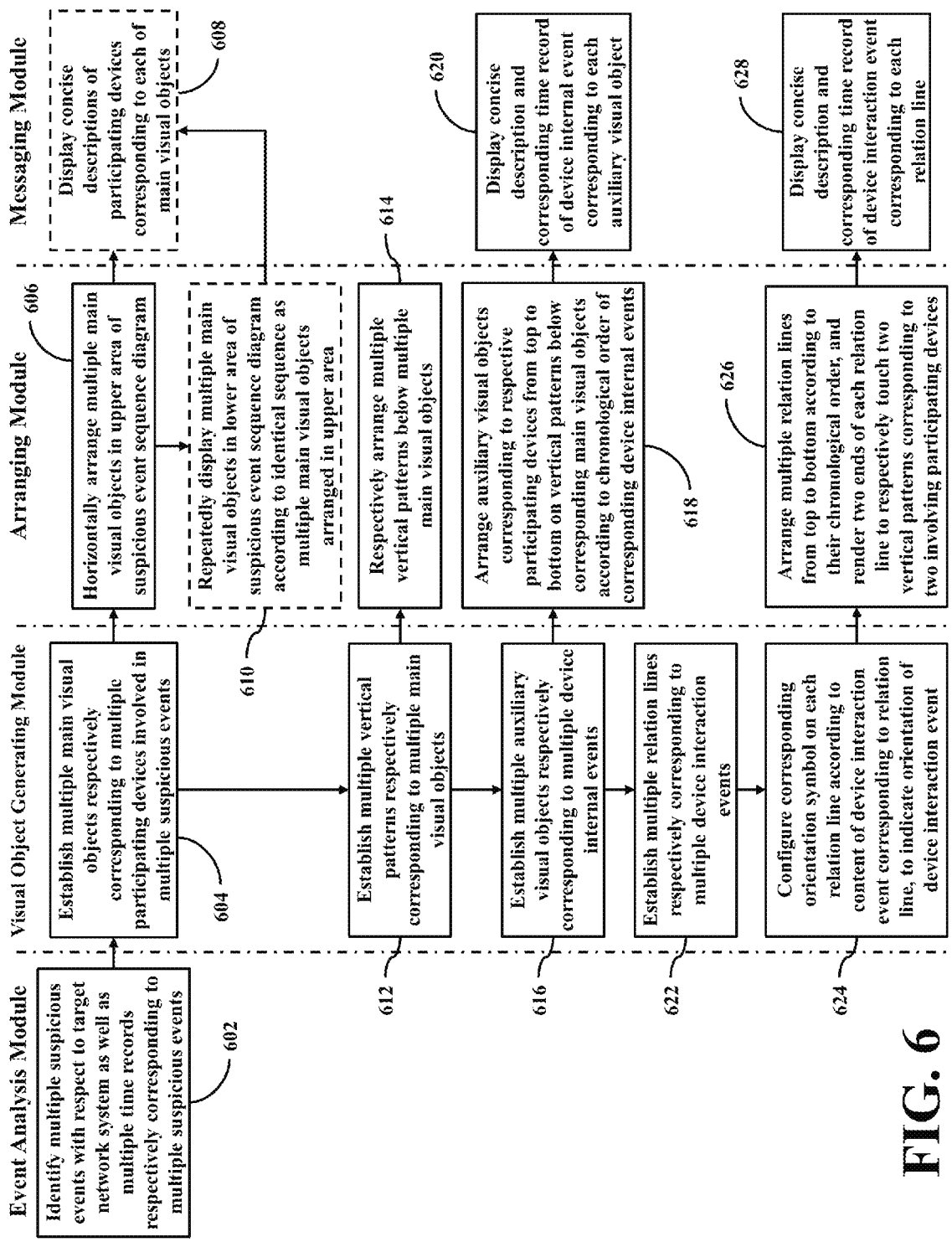
FIG. 6 shows a simplified flowchart of a method for generating a suspicious event sequence diagram according to one embodiment of the present disclosure.
Figure 7:
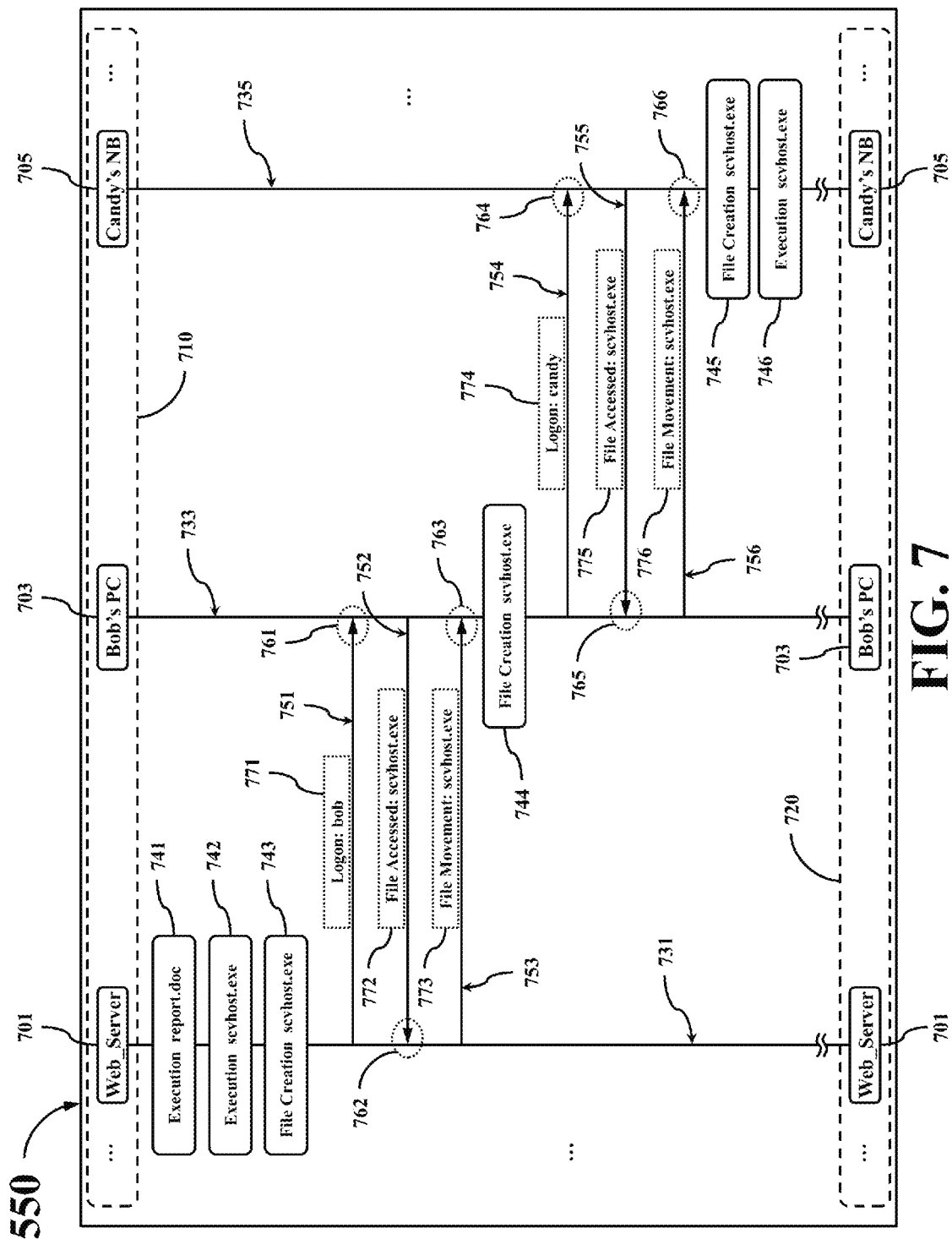
FIGS. 7-9 show simplified schematic diagrams of partial contents in the suspicious event sequence diagrams according to different embodiments of the present disclosure.
Figure 8:
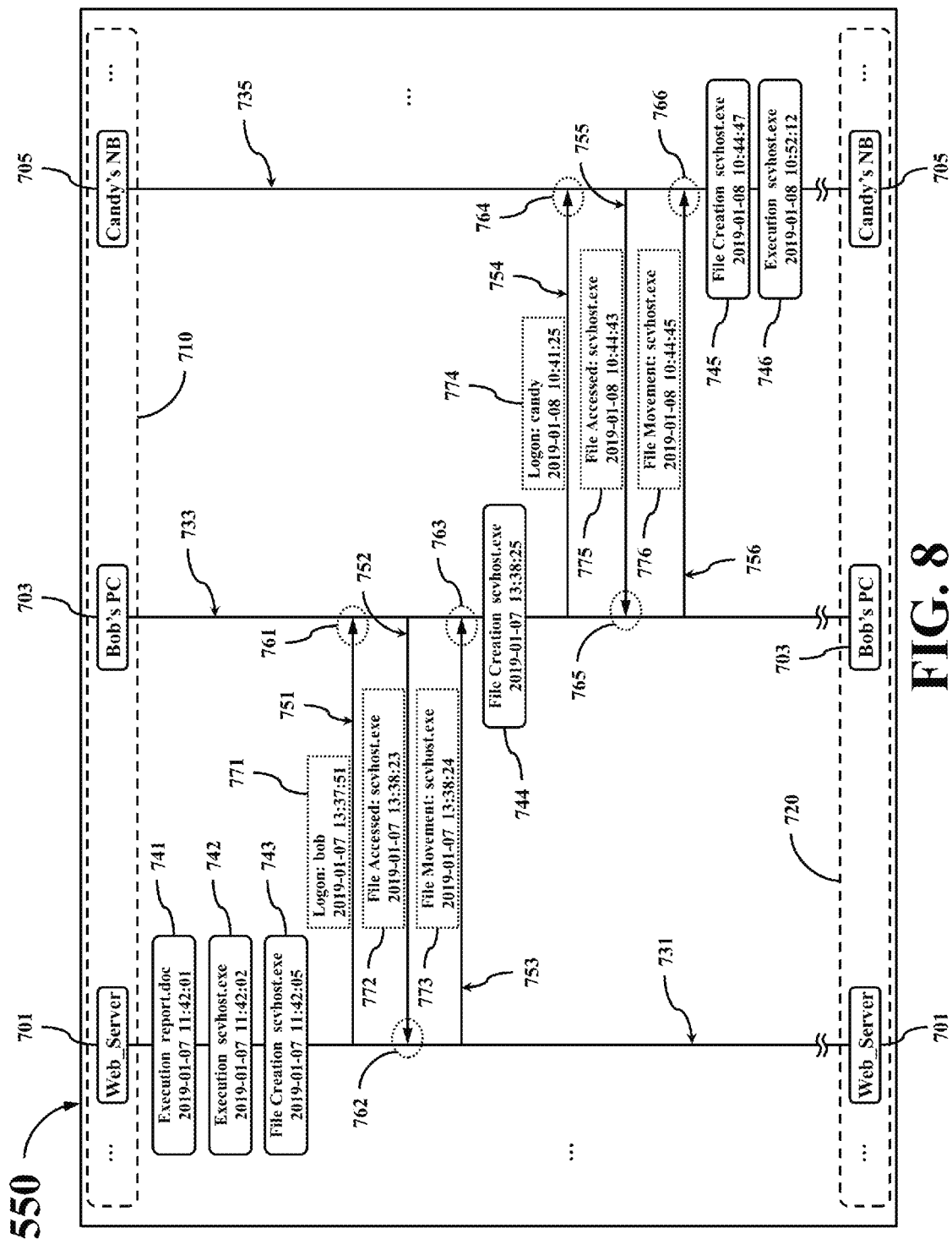

The suspicious event sequence diagram generating operation conducted by the suspicious event analysis device 140 will be further described below by reference to FIG. 6 through FIG. 8. FIG. 6 shows a simplified flowchart of a method for generating the suspicious event sequence diagram 550 according to one embodiment of the present disclosure. FIG. 7 and FIG. 8 show simplified schematic diagrams of partial contents in the suspicious event sequence diagram 550 according to different embodiments of the present disclosure.

In the flowchart of FIG. 6, operations within a column under the name of a specific device are operations to be performed by the specific device. For example, operations within a column under the label "event analysis module" are operations to be performed by the event analysis module 310 of the suspicious event sequence diagram generating program 150; operations within a column under the label "visual object generating module" are operations to be performed by the visual object generating module 320; operations within a column under the label "arranging module" are operations to be performed by the arranging module 330; and operations within a column under the label "messaging module" are operations to be performed by the messaging module 340. The same analogous arrangement also applies to the subsequent flowcharts.

In the operation 602, the event analysis module 310 of the suspicious event sequence diagram generating program 150 utilizes the control circuit 149 to identify multiple suspicious events with respect to the target network system 102 as well as multiple time records respectively corresponding to the multiple suspicious events according to the aforementioned multiple suspicious activities records and the corresponding multiple time stamps and multiple attribute tags.

For the event analysis module 310, the aforementioned multiple suspicious activities records, the corresponding multiple time stamps, and the multiple attribute tags are digital evidence that can be utilized for analyzing whether specific events took place in the target network system 102.

The event analysis module 310 may conduct a cross-comparison and an event correlation analysis on the aforementioned multiple suspicious activities records, the corresponding multiple time stamps, and the corresponding multiple attribute tags by adopting various rule matching algorithms or artificial intelligence algorithms so as to identify multiple suspicious events that are possibly associated with cyber breach activities in the target network system 102, and to identify multiple time records respectively corresponding to the aforementioned multiple suspicious events.

For example, the event analysis module 310 may conduct various cross-comparisons and event correlation analyses based on multiple suspicious activities records related to a specific computing device, so as to find out one or more suspicious events having sufficiently affirmative digital evidences capable of proving that the one or more suspicious events took place in the specific computing device. In addition, the event analysis module 310 may also conduct various cross-comparisons and event correlation analyses on multiple suspicious activities records with respect to two different computing devices, so as to find out one or more suspicious events having sufficiently affirmative digital evidences capable of proving that the one or more suspicious events took place between the two computing devices.

Moreover, the event analysis module 310 may also identify a start time or an end time for each suspicious event according to the aforementioned multiple time stamps, and utilize the identified start time or end time as a corresponding time record of the suspicious event.

For simplicity of illustration, the suspicious events took place within respective computing devices are hereinafter referred to as device internal events, while the suspicious events took place between two different computing devices are hereinafter referred to as device interaction events.

The types and quantity of the device internal events identified by the event analysis module 310 based on the aforementioned digital evidences (i.e., the suspicious activities records, the time stamps, and the attribute tags) are determined by the actual situation of the target network system 102. Similarly, the types and quantity of the device interaction events identified by the event analysis module 310 based on the aforementioned digital evidences are also determined by the actual situation of the target network system 102.

If the device internal events or the device interaction events identified by the event analysis module 310 have too many types, it would easily render the contents in the resulting suspicious event sequence diagram 550 become too crowded or messy, and thus cause the cyber security analysts to be interfered by noisy information, thereby adversely affecting the interpreting and analyzing efficiency of the cyber security analysts.

In order to decrease the problems described above, the event analysis module 310 may configure a corresponding first upper limit for the quantity of types of the device internal events, and configure a corresponding second upper limit for the quantity of types of the device interaction events. The aforementioned first upper limit and second upper limit may be the same with each other or may be different from each other.

In operations, the event analysis module 310 may select certain types of the device internal events and certain types of the device interaction events to be displayed in the suspicious event sequence diagram 550 according to the importance of the event type, rareness of the event type, sensitivity of the event type, event quantity, and/or other considering factors.

For example, the event analysis module 310 may limit the quantity of types of the device internal events that can be displayed in the suspicious event sequence diagram 550 to at most eight types, which are file creation events, file access events, registry creation events, schedule task events, file execution events, memory module detection events, memory process creation events, and privileges escalation events. In the meantime, the event analysis module 310 may limit the quantity of types of the device interaction events that can be displayed in the suspicious event sequence diagram 550 to at most six types, which are remote logon events, brute-force logon events, attempt logon events, remote access events, file moving events, and network download events. In other words, the aforementioned first upper limit is eight while the second upper limit is six in this embodiment.

In another embodiment, the event analysis module 310 may limit the quantity of types of the device internal events that can be displayed in the suspicious event sequence diagram 550 to at most three types, which are the aforementioned file creation events, file execution events, and memory process creation events. In the meantime, the event analysis module 310 may limit the quantity of types of the device interaction events that can be displayed in the suspicious event sequence diagram 550 to at most four types, which are the aforementioned remote logon events, remote access events, file moving events, and network download events. In other words, the aforementioned first upper limit is three while the second upper limit is four in this embodiment.

The substantial physical meanings of the respective events may be appreciated from their names, and the detailed definitions of respective events are determined by the analysis rules of the event correlation analysis conducted by the event analysis module 310. Under different analysis rules, the same event type may have slightly different specific definitions.

In practical applications, the event analysis module 310 may dynamically adjust the aforementioned first upper limit and second upper limit according to the display space of the suspicious event sequence diagram 550, or may flexibly adjust the aforementioned first upper limit and second upper limit in view of other design considerations.

For illustrative purpose, it is assumed hereinafter that the device internal events identified by the event analysis module 310 in the operation 602 have 3 types, which are the aforementioned file creation events, file execution events, and memory process creation events, while the device interaction events identified by the event analysis module 310 in the operation 602 have four types, which are the aforementioned remote logon events, remote access events, file moving events, and network download events. The quantity of the suspicious events of each type identified by the event analysis module 310 is related to the extent and scope of how the target network system 102 is breached by hackers, so the quantity of the suspicious events of each type may be different from other types.

The subsequent operations in FIG. 6 will be further described below by reference to partial contents of the suspicious event sequence diagram 550 shown in FIG. 7.

In the operation 604, the visual object generating module 320 establishes multiple main visual objects respectively corresponding to multiple participating devices involved in multiple suspicious events, so that different main visual objects respectively correspond to different participating devices.

The term "participating device" used throughout the description and the claims refers to the device entity involved in the multiple suspicious events defined by the event analysis module 310. Each participating device may refer to a computing device of the target network system 102, or may refer to other device entity located outside the target network system 102, such as the malicious file providing device 160 shown in FIG. 1.

In practice, the visual object generating module 320 may utilize various graphs, images, or text boxes to present respective main visual objects, and different main visual objects may have the same visual representation with each other or may have different visual representations from each other.

For example, in the embodiment of FIG. 7, the visual object generating module 320 utilizes a frame having a rounded rectangle shape to be the visual representation of exemplary main visual objects 701, 703, and 705. It is assumed hereinafter that the main visual objects 701, 703, and 705 respectively correspond to three computing devices 111, 112, and 113 involved in the suspicious events in the target network system 102.

In the operation 606, the arranging module 330 may horizontally arrange the aforementioned multiple main visual objects 701, 703, and 705 in an upper area 710 of the suspicious event sequence diagram 550.

In the operation 608, the messaging module 340 may display concise descriptions of the participating devices corresponding to each of the main visual objects 701, 703, and 705. In practice, the messaging module 340 may display messages that can be used by the cyber security analysts in recognizing the participating devices corresponding to the respective main visual objects, such as the device name, the IP address, the device alias code, the hardware identification code (e.g., MAC address), the device representative icon, the user name, the user identification code, the user nickname, or the user representative icon, or the like, on the respective main visual objects or near the respective main visual objects to be the concise descriptions of the corresponding participating devices.

For example, it is assumed hereinafter that the device names of the computing devices 111, 112, and 113 are "Web_Server", "Bob's PC", and "Candy's NB," respectively. As shown in FIG. 7, the messaging module 340 may respectively display the device names of the computing devices 111, 112, and 113 in the corresponding main visual objects 701, 703, and 705, so that the cyber security analysts can recognize the physical meaning of the respective main visual objects.

In the operation 610, the arranging module 330 may repeatedly display the multiple main visual objects 701, 703, and 705 in a lower area 720 of the suspicious event sequence diagram 550 according to an identical sequence as the multiple main visual objects 701, 703, and 705 arranged in the upper area 710.

Please note that in the aforementioned embodiment of FIG. 7, the visual object generating module 320 utilizes an identical visual representation to present all of the main visual objects 701, 703, and 705, but this is merely an exemplary embodiment, rather than a restriction to the practical implementations. In practice, the visual object generating module 320 may configure the visual representations of respective main visual objects according to the types of the corresponding participating devices, so that different main visual objects corresponding to different types of participating devices have different visual representations.

In the operation 612, the visual object generating module 320 establishes multiple vertical patterns respectively corresponding to the multiple main visual objects. In practice, the visual object generating module 320 may utilize various vertical lines, vertical stripes, or vertical images to present respective vertical patterns.

For example, in FIG. 7, the visual object generating module 320 presents exemplary vertical patterns 731, 733, and 735 respectively corresponding to the main visual objects 701, 703, and 705 in the form of vertical lines.

In the operation 614, the arranging module 330 may respectively arrange the aforementioned multiple vertical patterns 731, 733, and 735 below the multiple main visual objects 701, 703, and 705 to symbolize the timeline corresponding to respective main visual objects.

In the operation 616, the visual object generating module 320 establishes multiple auxiliary visual objects respectively corresponding to the multiple device internal events. In practice, the visual object generating module 320 may utilize various graphs, images, or text boxes to present the respective auxiliary visual objects, and different auxiliary visual objects may have the same visual representation with each other or may have different visual representations from each other.

For example, in FIG. 7, the visual object generating module 320 utilizes a frame having a rounded rectangle shape to be the visual representation of exemplary auxiliary visual objects 741, 742, 743, 744, 745, and 746, and different auxiliary visual objects respectively correspond to different device internal events.

In the operation 618, the arranging module 330 arranges the auxiliary visual objects corresponding to the respective participating devices from top to bottom on the vertical patterns below the corresponding main visual objects according to the chronological order of the corresponding device internal events.

For example, in FIG. 7, the arranging module 330 may arrange the auxiliary visual objects 741, 742, and 743 corresponding to the computing device 111 from top to bottom on appropriate positions of the vertical pattern 731 below the corresponding main visual object 701 according to the chronological order of the device internal events corresponding to the auxiliary visual objects 741, 742, and 743. In addition, the arranging module 330 may arrange the auxiliary visual object 744 corresponding to the computing device 112 on an appropriate position of the vertical pattern 733 below the corresponding main visual object 703 according to the chronological order of the device internal event corresponding to the auxiliary visual object 744. Moreover, the arranging module 330 may also arrange the auxiliary visual objects 745 and 746 corresponding to the computing device 113 from top to bottom on appropriate positions of the vertical pattern 735 below the main visual object 705 according to the chronological order of the device internal events corresponding to the auxiliary visual objects 745 and 746.

By the operations of the arranging module 330, the relative position between any two different auxiliary visual objects in the suspicious event sequence diagram 550 may reflect the chronological order between two device internal events corresponding to the two auxiliary visual objects. Please note that in the suspicious event sequence diagram 550, the spacing between two different auxiliary visual objects with respect to the vertical direction is not necessary to be directly proportional to the time difference between the two device internal events corresponding to the two auxiliary visual objects.

In the operation 620, the messaging module 340 may display a concise description of the device internal event corresponding to each auxiliary visual object. In practice, the messaging module 340 may display messages that can be used by the cyber security analysts in recognizing the essential contents of the device internal events corresponding to the auxiliary visual objects, such as the event name, the representative symbol, the representative image, concise text descriptions, or the like, on the respective auxiliary visual objects or near the respective auxiliary visual objects to be the concise descriptions of the corresponding device internal events.

For example, it is assumed hereinafter that the aforementioned event analysis module 310 has identified that there are three device internal events took place within the computing device 111, which are "a file execution event regarding a file: report.doc", "a file execution event regarding a file: scvhost.exe", and "a file creation event regarding a file: scvhost.exe" according to their chronological order; there is one device internal event took place within the computing device 112, which is "a file creation event regarding a file: scvhost.exe"; and there are two device internal events took place within the computing device 113, which are "a file creation event regarding a file: scvhost.exe" and "a file execution event regarding a file: scvhost.exe" according to their chronological order. As shown in FIG. 7, the messaging module 340 may respectively display concise text descriptions "Execution report.doc", "Execution scvhost.exe", and "File Creation scvhost.exe" respectively corresponding to the three device internal events took place within the computing device 111 in the corresponding auxiliary visual objects 741, 742, and 743. In addition, the messaging module 340 may display a concise text description "File Creation scvhost.exe" corresponding to the device internal event took place within the computing device 112 in the corresponding auxiliary visual object 744. Moreover, the messaging module 340 may also respectively display concise text descriptions "File Creation scvhost.exe" and "Execution scvhost.exe" respectively corresponding to the two device internal events took place within the computing device 113 in the corresponding auxiliary visual objects 745 and 746. As a result, the cyber security analysts can understand the essential contents of the device internal events according to the concise descriptions shown on the respective auxiliary visual objects.

Please note that the aforementioned concise text description corresponding to the respective device internal events is merely an exemplary embodiment, rather than a restriction to the practical implementations. In practice, the designer of the suspicious event sequence diagram generating program 150 may design other concise description manners that can be understood by the cyber security analysts for different types of the device internal events. For example, the concise description of each device internal event may be realized in the form of a combination of a representative symbol and a file name, a combination of a representative image and a file name, or a combination of an event name and a file representative image, or the like.

In addition, in the aforementioned embodiment of FIG. 7, the visual object generating module 320 utilizes the same visual representation to present all of the auxiliary visual objects 741~746, but this is merely an exemplary embodiment, rather than a restriction to the practical implementations. In practice, the visual object generating module 320 may configure the visual representation of respective auxiliary visual objects according to the types of the corresponding device internal events, so that different auxiliary visual objects corresponding to different types of device internal events have different visual representations.

In the operation 622, the visual object generating module 320 establishes multiple relation lines respectively corresponding to the multiple device interaction events. In practice, the visual object generating module 320 may utilize straight lines, broken lines, slightly-bended lines, wavy lines, or other lines with similar function to be the visual representation of respective relation lines, and different relation lines may have the same visual representation with each other or may have different visual representations from each other.

For example, in FIG. 7, the visual object generating module 320 presents exemplary relation lines 751, 752, 753, 754, 755, and 756 in the form of horizontal straight lines, while different relation lines respectively correspond to different device interaction events. In this embodiment, the visual representation of the aforementioned relation lines 751, 752, 753, 754, 755, and 756 are horizontal solid lines.

In the operation 624, the visual object generating module 320 configures a corresponding orientation symbol on each relation line according to the content of the device interaction event corresponding to the relation line, so as to indicate an orientation of the device interaction event. In practice, the visual object generating module 320 may utilize various arrows, finger graphs, or other graphs capable of indicating the orientation to present respective orientation symbols.

For example, in FIG. 7, the visual object generating module 320 utilizes arrows to be the visual representations of the orientation symbols 761, 762, 763, 764, 765, and 766, and respectively configures the orientation symbols 761, 762, 763, 764, 765, and 766 on the relation lines 751, 752, 753, 754, 755, and 756, so as to represent the orientation of the related device interaction events.

In the operation 626, the arranging module 330 arranges the multiple relation lines from top to bottom according to their chronological order, and renders two ends of each relation line to respectively touch two vertical patterns corresponding to two involving participating devices.

For example, in FIG. 7, the arranging module 330 may arrange the exemplary relation lines 751, 752, and 753 corresponding to the device interaction events took place between the computing device 111 and the computing device 112 from top to bottom according to the chronological order of the corresponding device interaction events, and render two ends of each of the relation lines 751, 752, and 753 to respectively touch the vertical pattern 731 corresponding to the computing device 111 and the vertical pattern 733 corresponding to the computing device 112, so that the relation lines 751, 752, and 753 are arranged between the vertical pattern 731 and the vertical pattern 733. In addition, the arranging module 330 may arrange the exemplary relation lines 754, 755, and 756 corresponding to the device interaction events took place between the computing device 112 and the computing device 113 from top to bottom according to the chronological order of the corresponding device interaction events, and render two ends of each of the relation lines 754, 755, and 756 to respectively touch the vertical pattern 733 corresponding to the computing device 112 and the vertical pattern 735 corresponding to the computing device 113, so that the relation lines 754, 755, and 756 are arranged between the vertical pattern 733 and the vertical pattern 735.

By the operation of the arranging module 330, the relative position between any two different relation lines in the suspicious event sequence diagram 550 may reflect the chronological order between two device interaction events corresponding to the two relation lines. Please note that in the suspicious event sequence diagram 550, the spacing between two different relation lines with respect to the vertical direction is not necessary to be directly proportional to the time difference between the two device interaction events corresponding to the two relation lines.

In the operation 628, the messaging module 340 may display a concise description of the device interaction event corresponding to each relation line. In practice, the messaging module 340 may display messages that can be used by the cyber security analyst in recognizing the essential contents of the device interaction events corresponding to the respective relation lines, such as the event name, the representative symbol, the representative image, concise text descriptions, or the like, on the respective relation lines or near the respective relation lines to be the concise descriptions of the corresponding device interaction events.

For example, it is assumed hereinafter that the aforementioned event analysis module 310 has identified that there are three device interaction events took place between the computing device 111 and the computing device 112, which are "a remote logon event regarding a user name: bob", "a remote access event regarding a file: scvhost.exe", and "a file moving event regarding a file: scvhost.exe" according to their chronological order; and there are three device interaction events took place between the computing device 112 and the computing device 113, which are "a remote logon event regarding a user name: candy", "a remote access event regarding a file: scvhost.exe", and "a file moving event regarding a file: scvhost.exe" according to their chronological order. As shown in FIG. 7, as to the three device interaction events took place between the computing device 111 and the computing device 112, the messaging module 340 would respectively display three descriptive messages 771, 772, and 773 above the corresponding relation lines 751, 752, and 753, and contents of the descriptive messages 771, 772, and 773 are concise text descriptions "Logon: bob", "File Accessed: scvhost.exe", and "File Movement: scvhost.exe" corresponding to the aforementioned three device interaction events. In addition, as to the three device interaction events took place between the computing device 112 and the computing device 113, the messaging module 340 would respectively display three descriptive messages 774, 775, and 776 above the corresponding relation lines 754, 755, and 756, and contents of the descriptive messages 774, 775, and 776 are concise text descriptions "Logon: candy", "File Accessed: scvhost.exe", and "File Movement: scvhost.exe" corresponding to the aforementioned three device interaction events. As a result, the cyber security analysts can understand the essential contents of the device interaction events according to the concise descriptions shown above the respective relation lines.

Please note that the aforementioned concise text description corresponding to the respective device interaction events is merely an exemplary embodiment, rather than a restriction to the practical implementations. In practice, the designer of the suspicious event sequence diagram generating program 150 may design other concise description manners that can be understood by the cyber security analysts for different types of the device interaction events. For example, the concise description of each device interaction event may be realized in the form of a combination of a representative symbol and a file name, a combination of a representative symbol and a user name, a combination of a representative image and a file name, a combination of a representative image and a user name, or a combination of an event name and a file representative image, or the like.

In addition, in the aforementioned embodiment of FIG. 7, the visual object generating module 320 utilizes the same visual representation to present all of the relation lines 751~756, but this is merely an exemplary embodiment, rather than a restriction to the practical implementations. In practice, the visual object generating module 320 may configure the visual representation of respective relation lines according to the types of the corresponding device interaction events, so that different relation lines corresponding to different types of device interaction events have different visual representations.

As can be appreciated from the foregoing descriptions that the suspicious event sequence diagram generating program 150 conducts analysis on the multiple suspicious activities records related to the target network system 102, the corresponding multiple time stamps, and the corresponding multiple attribute tags to identify multiple suspicious events and filter out unnecessary noisy data. In other words, the suspicious event sequence diagram 550 generated by the suspicious event sequence diagram generating program 150 can significantly decrease the data volume that the cyber security analysts need to pay attention to. Accordingly, the interference problem caused by numerous amounts of noise data to the cyber security analysts can be effectively mitigated.

In addition, the suspicious event sequence diagram generating program 150 further presents reference information of various dimensions, such as important suspicious events, participating devices involved in the suspicious events, chronological relationship among the suspicious events, device interaction behaviors within the intranet, the propagation direction of the suspicious events, or the like, in the suspicious event sequence diagram 550 at the same time by using concise visual representations. Therefore, the cyber security analysts are enabled to rapidly obtain the reference information of various dimensions, such as multiple suspicious events, involving participating devices, chronological relationship among the suspicious events, propagation directions of the suspicious events, or the like, from the aforementioned suspicious event sequence diagram 550 generated by the suspicious event analysis device 140. As a result, the cyber security analysts do not need to spend plenty of time to figure out which suspicious events were taking place from numerous digital evidences, and derive the chronological order of the suspicious events and the cause-and-effect relationship among the suspicious events.

Moreover, according to research of cognitive science, it can be appreciated that human have much higher efficiency in understanding graphical messages than text contents. Since the suspicious event sequence diagram 550 generated by the suspicious event sequence diagram generating program 150 can present the aforementioned reference information of various dimensions to the cyber security analysts by using intuitive visual representations, thus it significantly decreases the time required for the cyber security analysts to analyze the digital evidences, thereby effectively increasing the efficiency in diagnosing whether the target network system 102 is breached by hackers.

In some applications, the start time of respective suspicious event, the end time of respective suspicious event, and/or the time gap among different suspicious events may be one of the important consideration factors for the cyber security analysts in determining whether or not the target network system 102 has been breached by hackers. In order to provide these kinds of reference data to the cyber security analysts, the messaging module 340 may also display the corresponding time records of the device internal events corresponding to respective auxiliary visual objects in the operation 620, and/or may display the corresponding time records of the device interaction events corresponding to respective relation lines in the aforementioned operation 628.

In practice, the messaging module 340 may display the time records of the device internal events corresponding to respective auxiliary visual objects on or near the respective auxiliary visual objects. On the other hand, the messaging module 340 may display the time records of the device interaction events corresponding to respective relation lines on or near the respective relation lines.

For example, in partial contents of the suspicious event sequence diagram 550 shown in FIG. 8, the messaging module 340 may mark the time records of the device internal events corresponding to the auxiliary visual objects in the respective auxiliary visual objects, and may mark the time records of the device interaction events corresponding to the relation lines above the respective relation lines. As can be appreciated from the foregoing descriptions that the time record displayed in the suspicious event sequence diagram 550 by the messaging module 340 may be the start time or the end time of a corresponding suspicious event.

As a result, the cyber security analysts can rapidly recognize the timing information of respective device internal events or respective device interaction events according to the time records displayed in the suspicious event sequence diagram 550, and take these timing information as determination basis to further increase the accuracy of determining whether the target network system 102 is breached by hackers.

The foregoing descriptions regarding the generation approaches, the physical meanings, and related advantages of other visual elements shown in the FIG. 7 are also applicable to the embodiment of FIG. 8. For the sake of brevity, the descriptions will not be repeated here.

Figure 9:
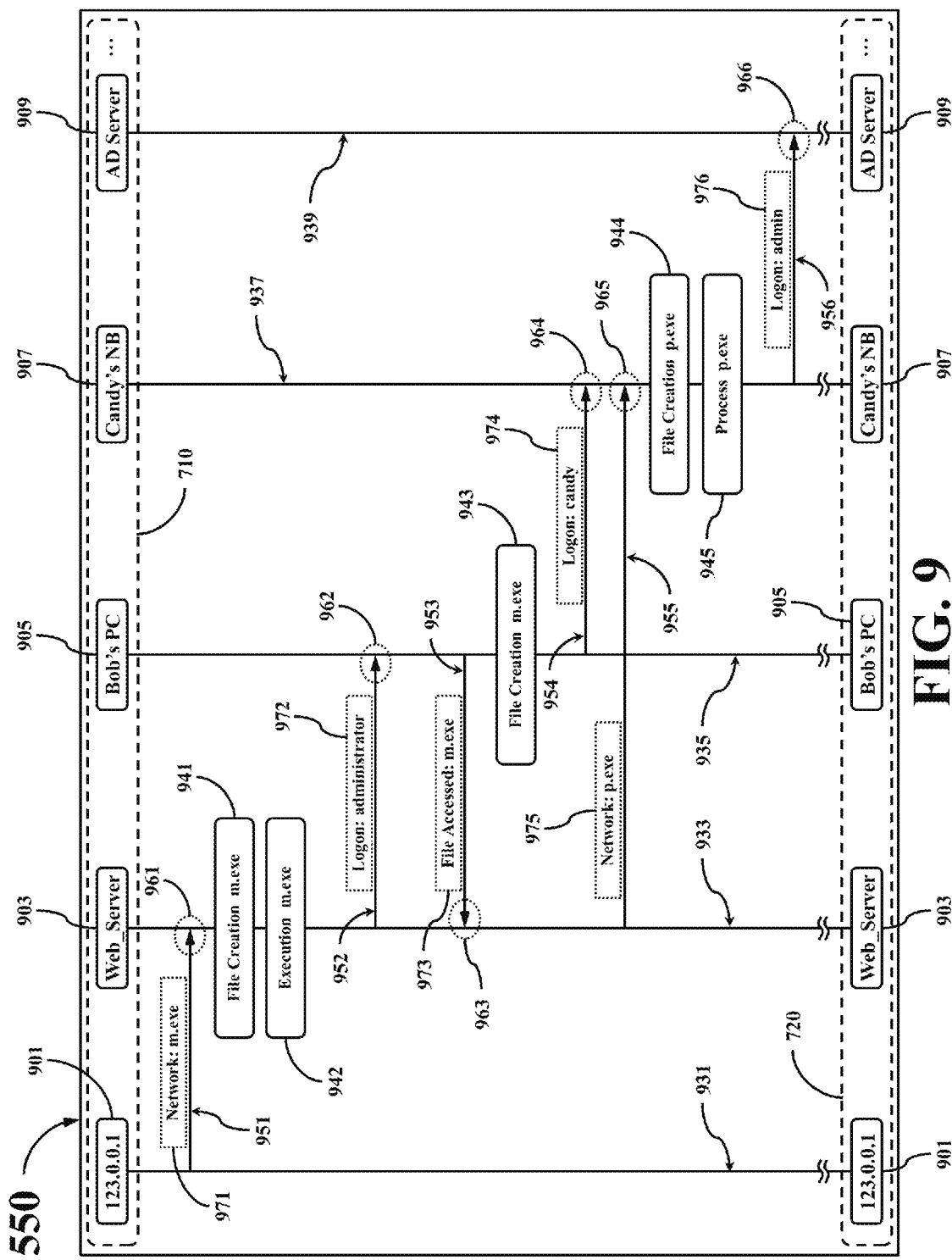

Please refer to FIG. 9, which shows a simplified schematic diagram of partial contents in the suspicious event sequence diagram 550 according to another embodiment of the present disclosure. As elaborated in the foregoing description, the event analysis module 310 of the suspicious event sequence diagram generating program 150 utilizes the control circuit 149 to identify multiple suspicious events and multiple corresponding time records with respect to the target network system 102 in the aforementioned operation 602. In some application scenarios, the multiple suspicious events identified by the event analysis module 310 not only involve some participating devices in the target network system 102, but also involve other participating devices located outside the target network system 102 (e.g., the aforementioned malicious file providing device 160). In this situation, the visual object generating module 320 also establishes corresponding main visual objects regarding other participating devices located outside the target network system 102 in the aforementioned operation 604.

In the embodiment of FIG. 9, the suspicious event sequence diagram 550 comprises exemplary main visual objects 901, 903, 905, 907, and 909; exemplary vertical patterns 931, 933, 934, 937, and 939; exemplary auxiliary visual objects 941, 942, 943, 944, and 945; exemplary relation lines 951, 952, 953, 954, 955, and 956; exemplary orientation symbols 961, 962, 963, 964, 965, and 966; and exemplary descriptive messages 971, 972, 973, 974, 975, and 976.

For the convenience of descriptions, it is assumed hereinafter that the main visual object 901 in FIG. 9 corresponds to the malicious file providing device 160 located outside the target network system 102, and the IP address of the malicious file providing device 160 is "123.0.0.1"; the main visual objects 903, 905, 907, and 909 respectively correspond to four computing devices 111, 112, 113, and 114 involved in the suspicious events in the target network system 102, and the device names of the computing devices 111, 112, 113, and 114 are "Web_Server", "Bob's PC", "Candy's NB", and "AD Server"; the auxiliary visual objects 941 and 942 respectively correspond to two device internal events took place within the computing device 111, which are "a file creation event regarding a file: m.exe" and "a file execution event regarding a file: m.exe" according to their chronological order; the auxiliary visual object 943 corresponds to one device internal event took place within the computing device 112, which is "a file creation event regarding a file: m.exe"; the auxiliary visual objects 944 and 945 respectively correspond to two device internal events took place within the computing device 113, which are "a file creation event regarding a file: p.exe" and "a memory process creation event regarding a file: p.exe" according to their chronological order; the relation line 951 corresponds to one device interaction event took place between the malicious file providing device 160 and the computing device 111, which is "a network download event regarding a file: m.exe"; the relation lines 952 and 953 correspond to two device interaction events took place between the computing device 111 and computing device 112, which are "a remote logon event regarding a user name: administrator" and "a remote access event regarding a file: m.exe" according to their chronological order; the relation line 954 corresponds to one device interaction event took place between the computing device 112 and the computing device 113, which is "a remote logon event regarding a user name: candy"; the relation line 955 corresponds to one device interaction event took place between the computing device 111 and the computing device 113, which is "a network download event regarding a file: p.exe"; and the relation line 956 corresponds to one device interaction event took place between the computing device 113 and the computing device 114, which is "a remote logon event regarding a user name: admin".

When generating the suspicious event sequence diagram 550 of FIG. 9, the visual object generating module 320 of the suspicious event sequence diagram generating program 150 performs the operations 604, 612, 616, and 622 in FIG. 6 to establish the aforementioned main visual objects 901~909, the vertical patterns 931~939, the auxiliary visual objects 941~945, and the relation lines 951~956. In addition, the visual object generating module 320 also performs the operation 624 in FIG. 6 to configure the aforementioned orientation symbols 961~966.

Similar to the aforementioned embodiments of FIG. 7 and FIG. 8, the arranging module 330 performs the operations 606, 610, 614, 618, and 626 in FIG. 6 to arrange the main visual objects 901~909, the vertical patterns 931~939, the auxiliary visual objects 941~945, the relation lines 951~956, and the orientation symbols 961~966 to form the scheme shown in FIG. 9.

The messaging module 340 then performs the operations 608,620, and 628 in FIG. 6 to display concise descriptions of the participating devices corresponding to the respective main visual objects, concise descriptions of the device internal events corresponding to the respective auxiliary visual objects, and concise descriptions of the device interaction events corresponding to the respective relation lines.

For example, as shown in FIG. 9, the messaging module 340 may display the IP address of the malicious file providing device 160 in the corresponding main visual object 901 as a concise description, and respectively display the device names of the computing devices 111~114 in the corresponding main visual objects 903~909 as concise descriptions, so that the cyber security analysts can recognize the physical meanings of respective main visual objects.

In addition, the messaging module 340 may respectively display concise text descriptions "File Creation m.exe" and "Execution m.exe" respectively corresponding to the two device internal events took place within the computing device 111 in the corresponding auxiliary visual objects 941 and 942 as concise descriptions; display a concise text description "File Creation m.exe" corresponding to the device internal event took place within the computing device 112 in the corresponding auxiliary visual object 943 as a concise description; and respectively display concise text descriptions "File Creation p.exe" and "Process p.exe" corresponding to the two device internal events took place within the computing device 113 in the corresponding auxiliary visual objects 944 and 945 as concise descriptions. As a result, the cyber security analysts can understand the essential contents of the device internal events represented by respective auxiliary visual objects according to the concise descriptions shown on the respective auxiliary visual objects.

For the single device interaction event took place between the malicious file providing device 160 and the computing device 111, the messaging module 340 may display the descriptive message 971 above the corresponding relation line 951 as a concise description, and the content of the descriptive message 971 is a concise text description "Network: m.exe" corresponding to the aforementioned device interaction event. For the two device interaction events took place between the computing device 111 and the computing device 112, the messaging module 340 may respectively display the descriptive messages 972 and 973 above the corresponding relation lines 952 and 953 as concise descriptions, and contents of the descriptive messages 972 and 973 are concise text descriptions "Logon: administrator" and "File Accessed: m.exe" corresponding to the aforementioned two device interaction events. For the single device interaction event took place between the computing device 112 and the computing device 113, the messaging module 340 may display the descriptive message 974 above the corresponding relation line 954 as a concise description, and the content of the descriptive message 974 is a concise text description "Logon: candy" corresponding to the aforementioned device interaction event. For the single device interaction event took place between the computing device 111 and the computing device 113, the messaging module 340 may display the descriptive message 975 above the corresponding relation line 955 as a concise description, and the content of the descriptive message 975 is a concise text description "Network: p.exe" corresponding to the aforementioned device interaction event. In addition, for the single device interaction event took place between the computing device 113 and the computing device 114, the messaging module 340 may display the descriptive message 976 above the corresponding relation line 956 as a concise description, and the content of the descriptive message 976 is a concise text description "Logon: admin" corresponding to the aforementioned device interaction event. As a result, the cyber security analysts can understand the essential contents of the device interaction events represented by respective relation lines according to the concise descriptions above the respective relation lines.

In comparison with the embodiments of FIG. 7 and FIG. 8, the suspicious event sequence diagram 550 of FIG. 9 not only presents computing devices involved in suspicious events in the target network system 102, but also presents external device entities involved in the suspicious events (e.g., the aforementioned malicious file providing device 160), the concise contents and occurrence times of the suspicious interaction events took place between the target network system 102 and external device entities, and the chronological relationship among the suspicious interaction events and other suspicious events.

Obviously, the suspicious event sequence diagram 550 generated by the suspicious event sequence diagram generating program 150 can present the suspicious interaction relationship between the devices within the target network system 102, the suspicious interaction relationship between the target network system 102 and external devices, and reference information of other various dimensions to the cyber security analysts by using intuitive visual representations. Such approach not only significantly reduces the data volume that the cyber security analysts need to pay attention to, but also increases the cyber security analysts' efficiency and accuracy in diagnosing whether the target network system 102 is breached by hackers.

The aforementioned descriptions regarding other related advantages in FIG. 7 and FIG. 8 are also applicable to the embodiment of FIG. 9. For the sake of brevity, the descriptions will not be repeated here.

In the aforementioned embodiments of FIG. 7 through FIG. 9, each of the auxiliary visual objects generated by the event analysis module 310 of the suspicious event sequence diagram generating program 150 represents a device internal event having sufficiently affirmative digital evidences capable of proving the existence of the device internal event. Each of the relation lines generated by the event analysis module 310 represents a device interaction event having sufficiently affirmative digital evidences capable of proving the existence of the device interaction event.

Sometimes, some digital evidences caused by the cyberattacks may result in a certain degree of correlation between some device internal events and some device interaction events identified by the event analysis module 310.

However, some sophisticated cyberattacks may erase a portion of digital evidences generated during the attack. In addition, the device activities reporting programs 120 installed in respective computing devices may lose some suspicious activities records and time stamps during detecting and collecting the suspicious activities records and time stamps from the corresponding computing device due to various different reasons, such as entering into a power saving mode, entering into a sleep mode, system recourse constraint, or accidental power interruption. In the situation described above, it may cause the event analysis module 310 unable to directly confirm whether some suspicious events ever took place according to the obtained digital evidences.

To address the aforementioned problems, the suspicious event sequence diagram generating program 150 may conduct a cross-comparison analysis on the identified suspicious events and the related time records in the situation that the obtained digital evidences are insufficient to further determine whether there exist other suspicious events that likely took place within the target network system 102. If yes, then the suspicious event sequence diagram generating program 150 may present the related information of speculated suspicious events in the suspicious event sequence diagram 550 to be auxiliary data for the cyber security analysts when making judgement.

Figure 10:
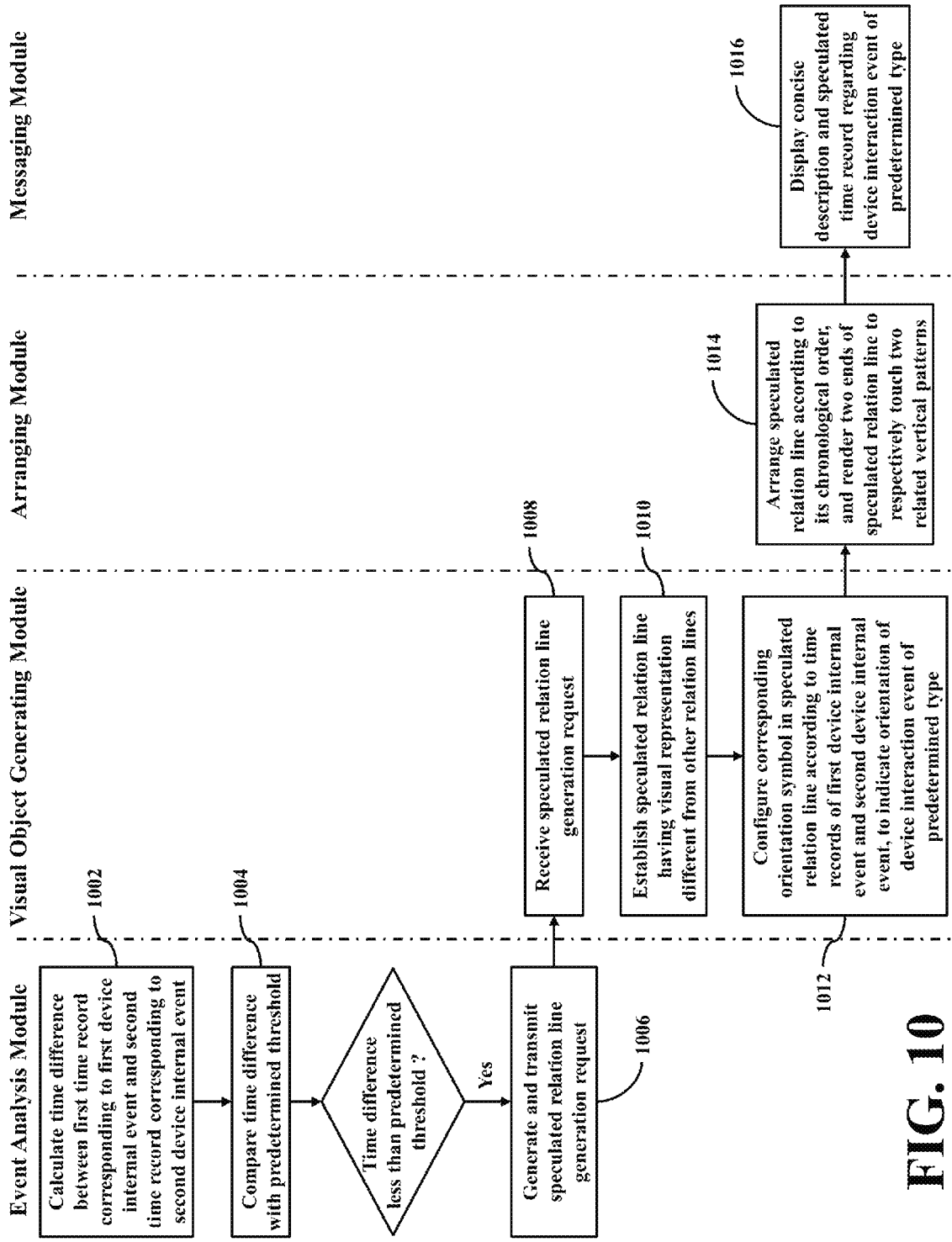
FIG. 10 shows a simplified flowchart of a method for generating relation lines in the suspicious event sequence diagram according to one embodiment of the present disclosure.

The operation of how the suspicious event sequence diagram generating program 150 determines whether there exists any missing suspicious event will be further described in the following by reference to FIG. 10. FIG. 10 shows a simplified flowchart of a method for generating relation lines in the suspicious event sequence diagram 550 according to one embodiment of the present disclosure.

In operation, if the event analysis module 310, by utilizing the control circuit 149, identifies that a first device internal event took place within a first participating device, and a second device internal event took place within a second participating device, but the event analysis module 310 cannot directly confirm whether or not a device interaction event of a predetermined type took place between the first participating device and the second participating device based on the existing digital evidences, then the suspicious event sequence diagram generating program 150 may perform the operations in FIG. 10 to conduct a further cross-comparison, so as to determine whether a device interaction event of the predetermined type took place between the first participating device and the second participating device.

In the operation 1002, the event analysis module 310 calculates a time difference between a first time record corresponding to the first device internal event and a second time record corresponding to the second device internal event.

For the sake of easier understanding, the aforementioned suspicious event sequence diagram 550 in FIG. 9 is taken as an example below. It can be appreciated from the elaborations of FIG. 9 that in the aforementioned operation 602, the event analysis module 310 identifies that two device internal events took place within the computing device 111, which are "the file creation event regarding the file: m.exe" and "the file execution event regarding the file: m.exe"; one device internal event took place within the computing device 112, which is "the file creation event regarding the file: m.exe"; and two device interaction events took place between the computing device 111 and the computing device 112, which are "the remote logon event regarding the user name: administrator" and "the remote access event regarding the file: m.exe".

However, the suspicious event sequence diagram 550 of FIG. 9 does not display any relation line representing that "a file moving event regarding a file: m.exe" took place between the computing device 111 and the computing device 112. This means that the event analysis module 310 is unable to directly confirm whether or not "the file moving event regarding the file: m.exe" took place between the computing device 111 and the computing device 112 based on the available digital evidences. In this situation, the suspicious event sequence diagram generating program 150 may perform the operations in FIG. 10 to determine whether "the file moving event regarding the file: m.exe" took place between the computing device 111 and the computing device 112.

For example, in the operation 1002, the event analysis module 310 may select "the file moving event regarding the file: m.exe" took place in the computing device 111 to be the aforementioned first device internal event, select "the file creation event regarding the file: m.exe" took place in the computing device 112 to be the aforementioned second device internal event, and then calculate the time difference between the two device internal events. It can be appreciated from the foregoing descriptions that the event analysis module 310 identifies the time records corresponding to respective suspicious events in the aforementioned operation 602. Therefore, the event analysis module 310 is able to calculate the time difference between the two "file creation events regarding the file: m.exe" by simply conducting a subtraction operation on the values of the time records corresponding to the aforementioned two device internal events.

In the operation 1004, the event analysis module 310 compares the time difference with a predetermined threshold. In practice, the event analysis module 310 may configure the aforementioned predetermined threshold to a reasonable length of time, for example, five minutes, three minutes, two minutes, one minute, or the like.

If the time difference between the above two device internal events is greater than or equals to the predetermined threshold, then the event analysis module 310 may determine that the two device internal events are independent events, and have no particularly obvious correlation with each other. Therefore, the event analysis module 310 may not need to conduct other cross-comparisons on the aforementioned two device internal events.

On the contrary, if the time difference between the above two device internal events is less than the predetermined threshold, then it means that there is an affirmative chronological correlation between the two device internal events. Therefore, the event analysis module 310 may determine that the two device internal events are correlated events, and thus infer that it is highly likely that a device interaction event of a predetermined type took place between the computing device 111 and the computing device 112. In this embodiment, the aforementioned device interaction event of the predetermined type refers to "a file moving event regarding a file: m.exe". In this situation, the event analysis module 310 performs the operation 1006.

In the operation 1006, the event analysis module 310 generates a speculated relation line generation request corresponding to the aforementioned device interaction event of the predetermined type, and transmits the speculated relation line generation request to the visual object generating module 320.

In the operation 1008, the visual object generating module 320 receives the speculated relation line generation request generated by the event analysis module 310.

In the operation 1010, the visual object generating module 320 establishes a speculated relation line having a visual representation different from other relation lines according to the speculated relation line generation request. In practice, the visual object generating module 320 may utilize a straight line, a broken line, a slightly-bended line, a wavy line, or other line with similar function to be the visual representation of the speculated relation line.

Figure 11:
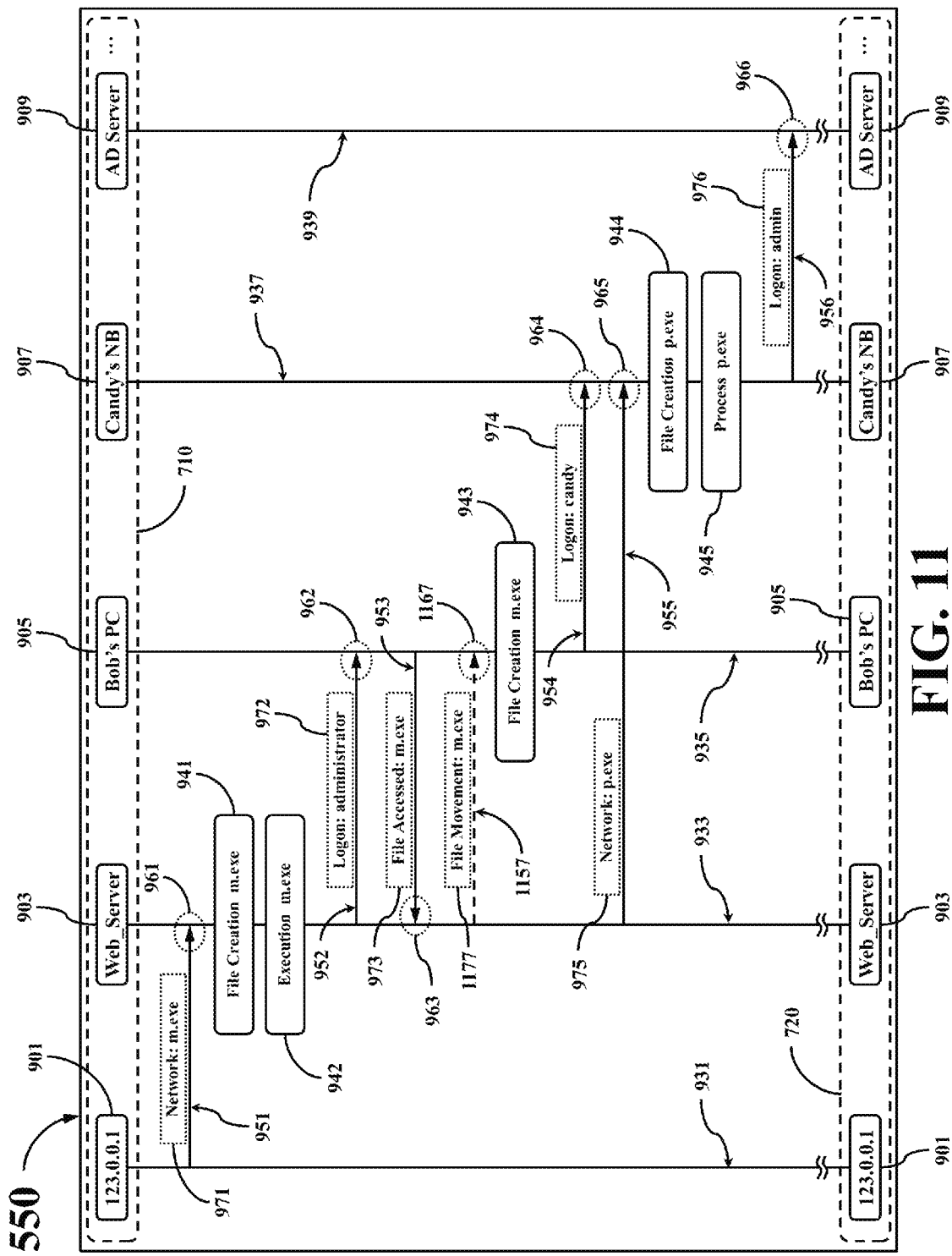
FIGS. 11-12 show simplified schematic diagrams of partial contents in the suspicious event sequence diagrams according to different embodiments of the present disclosure.

For example, in the embodiment of FIG. 11, the visual object generating module 320 establishes a speculated relation line 1157 in the suspicious event sequence diagram 550 according to the speculated relation line generation request, and utilizes a horizontal dotted line to be the visual representation of the speculated relation line 1157, so as to distinguish the speculated relation line 1157 from other relation lines 951~956. As a result, the cyber security analysts can learn from the visual representation of the speculated relation line 1157 that the device interaction event represented by the speculated relation line 1157 is speculated, and there lack sufficiently affirmative digital evidences for directly proving the speculated device interaction event.

In the operation 1012, the visual object generating module 320 may configure a corresponding orientation symbol 116 in the speculated relation line 1157 according to the time records of the first device internal event and the second device internal event, so as to indicate an orientation of the device interaction event of the predetermined type. In practice, the visual object generating module 320 may utilize various arrows, finger graphs, or other graphs capable of indicating the orientation to present the orientation symbol 1167.

For example, in FIG. 11, the visual object generating module 320 utilizes an arrow to be the visual representation of the orientation symbol 1167, and configures the orientation symbol 1167 on the speculated relation line 1157 to represent the orientation of the aforementioned device interaction event of the predetermined type.

In the operation 1014, the arranging module 330 arranges the speculated relation line 1157 corresponding to the aforementioned device interaction event of the predetermined type between two corresponding vertical patterns according to its chronological order, and renders the two ends of the speculated relation line 1157 to respectively touch the two related vertical patterns.

For example, in FIG. 11, the arranging module 330 may arrange the speculated relation line 1157 to an appropriate position between the vertical pattern 933 corresponding to the main visual object 903 and the vertical pattern 935 corresponding to the main visual object 905 according to the possible occurrence time of the aforementioned device interaction event of the predetermined type, and renders the two ends of the speculated relation line 1157 to respectively touch the vertical pattern 933 and the vertical pattern 935.

In the operation 1016, the messaging module 340 may display a concise description regarding the device interaction event of the predetermined type. In practice, the messaging module 340 may display messages that can be used by the cyber security analysts in recognizing the essential contents of the device interaction event corresponding to the speculated relation line 1157, such as the event name, the representative symbol, the representative image, concise text descriptions, or the like, on the speculated relation line 1157 or near the speculated relation line 1157 to be the concise description of the corresponding device interaction event.

For example, in the aforementioned operation, the event analysis module 310 has speculated that "a file moving event regarding a file: m.exe" highly likely took place between the computing device 111 and the computing device 112. Therefore, as shown in FIG. 11, as to the aforementioned speculated device interaction event, the messaging module 340 may display a descriptive message 1177 above the speculated relation line 1157, and the content of the descriptive message 1177 is a concise text description "File Movement: m.exe" corresponding to the aforementioned speculated device interaction event. As a result, the cyber security analysts can understand the essential content of the device interaction event speculated by the suspicious event sequence diagram generating program 150 according to the concise description above the speculated relation line 1157. That is, a device interaction event of the predetermined type (i.e., "the file moving event regarding the file: m.exe") highly likely took place between the computing device 111 and the computing device 112.

Similar to the aforementioned embodiment of FIG. 8, the messaging module 340 may also respectively display the time records of the device internal events corresponding to the auxiliary visual objects 941~945 on the respective auxiliary visual objects or near the respective auxiliary visual objects. On the other hand, the messaging module 340 may also display the time records of the device interaction events corresponding to the relation lines 951~956 on the respective relation lines or near the respective relation lines.

Figure 12:
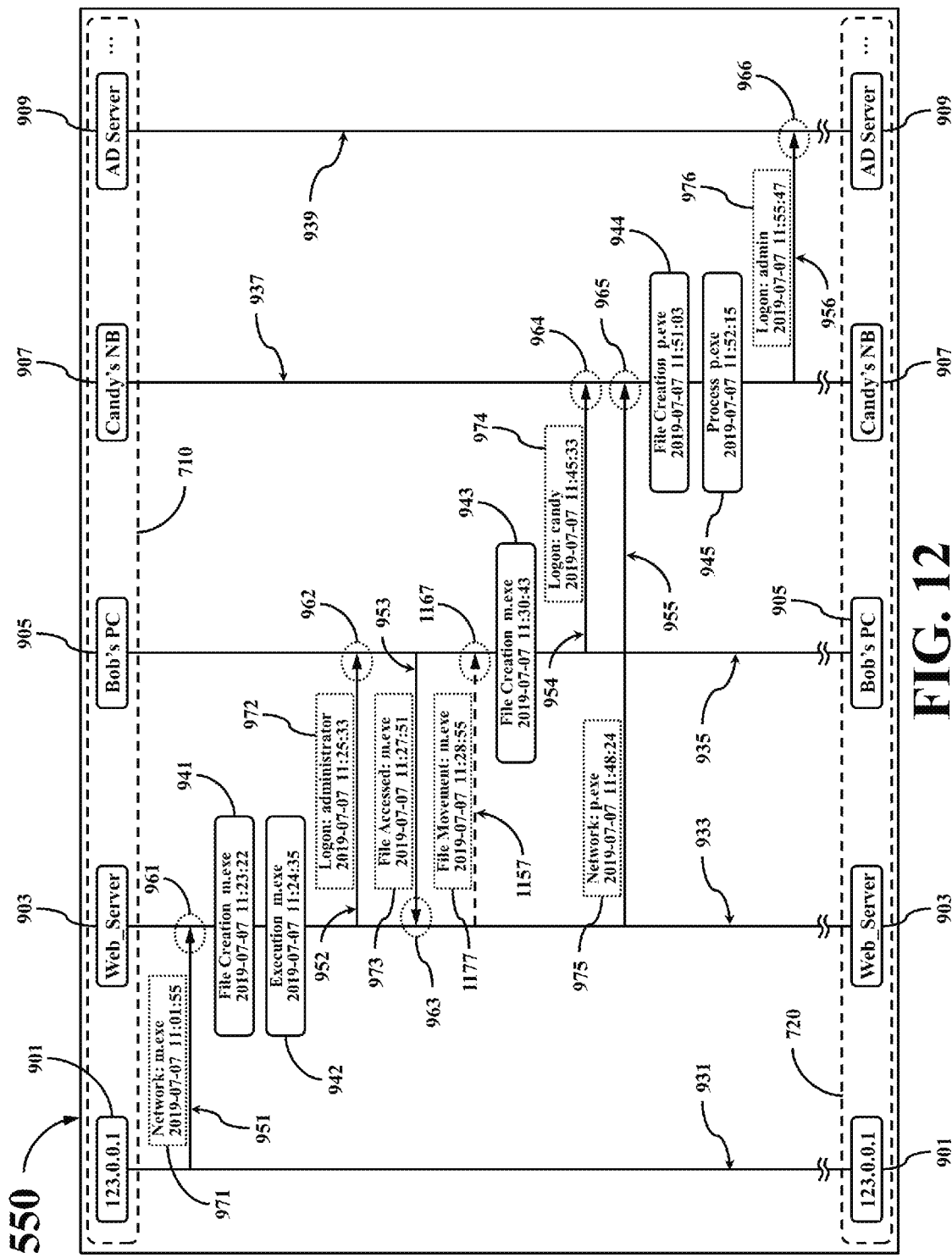

For example, in partial contents of the suspicious event sequence diagram 550 shown in FIG. 12, the messaging module 340 may mark the time records of the device internal events corresponding to the auxiliary visual objects in the respective auxiliary visual objects, and may mark the time records of the device interaction events corresponding to the relation lines above the respective relation lines. As can be appreciated from the foregoing descriptions that each of the time records displayed in the suspicious event sequence diagram 550 by the messaging module 340 may be the start time or the end time of a corresponding suspicious event.

In addition, the messaging module 340 may display the time record of the device interaction event corresponding to the speculated relation line 1157 on the speculated relation line 1157 or near the speculated relation line 1157.

For example, in the embodiment of FIG. 12, the messaging module 340 may mark a possible time record (i.e., a speculated time record) of the aforementioned speculated device interaction event above the speculated relation line 1157. Similarly, the time record marked by the messaging module 340 for the speculated relation line 1157 may be a possible start time or a possible end time of the above speculated device interaction event.

As a result, the cyber security analysts can rapidly recognize the timing information of respective device internal events or respective device interaction events according to the time records displayed in FIG. 12, and take these timing information as determination basis to further increase the accuracy of determining whether the target network system 102 is breached by hackers. In addition, the cyber security analysts can also rapidly recognize the possible timing of the aforementioned speculated device interaction event according to the time record of the speculated relation line 1157, and take other information as reference to determine the reliability of the device interaction event. This approach not only increases the determining efficiency of the cyber security analysts, but also decreases the possibility of erroneous judgement made by the cyber security analysts.

Please note that in the aforementioned operation 1002, the first device internal event and the second device internal event selected by the event analysis module 310 are "the file creation event regarding the file: m.exe" took place in the computing device 111 and "the file creation event regarding the file: m.exe" took place in the computing device 112, and thus the first device internal event and the second device internal event are the same type (i.e., both are the file creation event regarding the same file in this case). But this is merely an exemplary embodiment, rather than a restriction to the practical implementations.

For example, in the aforementioned operation 1002, the event analysis module 310 may instead select "the file execution event regarding the file m.exe" took place in the computing device 111 to be the first device internal event, and then calculate a time difference between "the file creation event regarding the file: m.exe" took place in the computing device 112 and the first device internal event. In other words, the targets of time difference calculation conducted by the event analysis module 310 in the aforementioned operation 1002 are not limited to device internal events of the same type.

In addition, the suspicious event sequence diagram generating program 150 may perform the operations in FIG. 10 at any time during generating the aforementioned suspicious event sequence diagram 550.

The foregoing descriptions regarding the generation approaches, the physical meanings, and related advantages of other visual elements shown in FIG. 10 are also applicable to the embodiments of FIG. 11 and FIG. 12. For the sake of brevity, the descriptions will not be repeated here.

Please note that the executing orders of the operations in the aforementioned FIG. 6 and FIG. 10 are merely an exemplary embodiment, rather than a restriction to the practical implementations. For example, in FIG. 6, there is no restriction on the executing order among the operations 604, 612, 616, and 622 performed by the visual object generating module 320, and thus the executing order of these operations can be flexibly adjusted, or theses operations may be performed simultaneously. There is no restriction on the executing order among the operations 606, 610, 614, 618, and 626 performed by the arranging module 330, and thus the executing order of these operations can be flexibly adjusted, or theses operations may be performed simultaneously. There is no restriction on the executing order among the operations 608, 620, and 628 performed by the messaging module 340, and the executing order of these operations can be flexibly adjusted, or these operations may be performed simultaneously.

In addition, the operations performed by the messaging module 340 may be adjusted to be prior to the operations performed by the arranging module 330. Moreover, the operation 624 may also be instead performed after the operation 626 or the operation 628.

For another example, in FIG. 10, the operation 1014 may also be instead performed between the operation 1010 and 1012. The operation 1012 may be instead performed after the operation 1016.

In the aforementioned embodiments, the multiple attribute tags corresponding to the multiple suspicious activities records are set by the device activities reporting program 120 installed in the respective computing devices during the operation 404, but this is merely an exemplary embodiment, rather than a restriction to the practical implementations.

In practice, the operation 404 may alternatively be performed by the activity records collection device 130. That is, in the operations of the aforementioned FIG. 4, the device activities reporting program 120 only needs to perform the operation 402 and 406, and the device activities reporting program 120 only needs to transmit the suspicious activities records and the corresponding time stamps to the activity records collection device 130 in the operation 406. After the activity records collection device 130 receives the suspicious activities records and the corresponding time stamps, the activity records collection device 130 may perform the operation 404 to create multiple attribute tags respectively corresponding to the multiple suspicious activities records.

In some embodiments, the visual representation of the speculated relation lines (e.g., the speculated relation line 1157 in FIG. 11 and FIG. 12) in the suspicious event sequence diagram 550 may be realized in other forms or may be realized in the same form as other relation lines (e.g., the relation lines 751~756 in FIG. 8 or the relation lines 951~956 in FIG. 11) in the suspicious event sequence diagram 550.

In addition, in some embodiments, the main visual objects positioned in the lower area 720 of the suspicious event sequence diagram 550 may be omitted.

In application environments where the quantity of the computing devices in the target network system 102 is not much or the target network system 102 has very sufficient networking bandwidth with external networks, the activity records collection device 130 in the aforementioned cyber breach diagnostics system 100 may be omitted.

Figure 13:
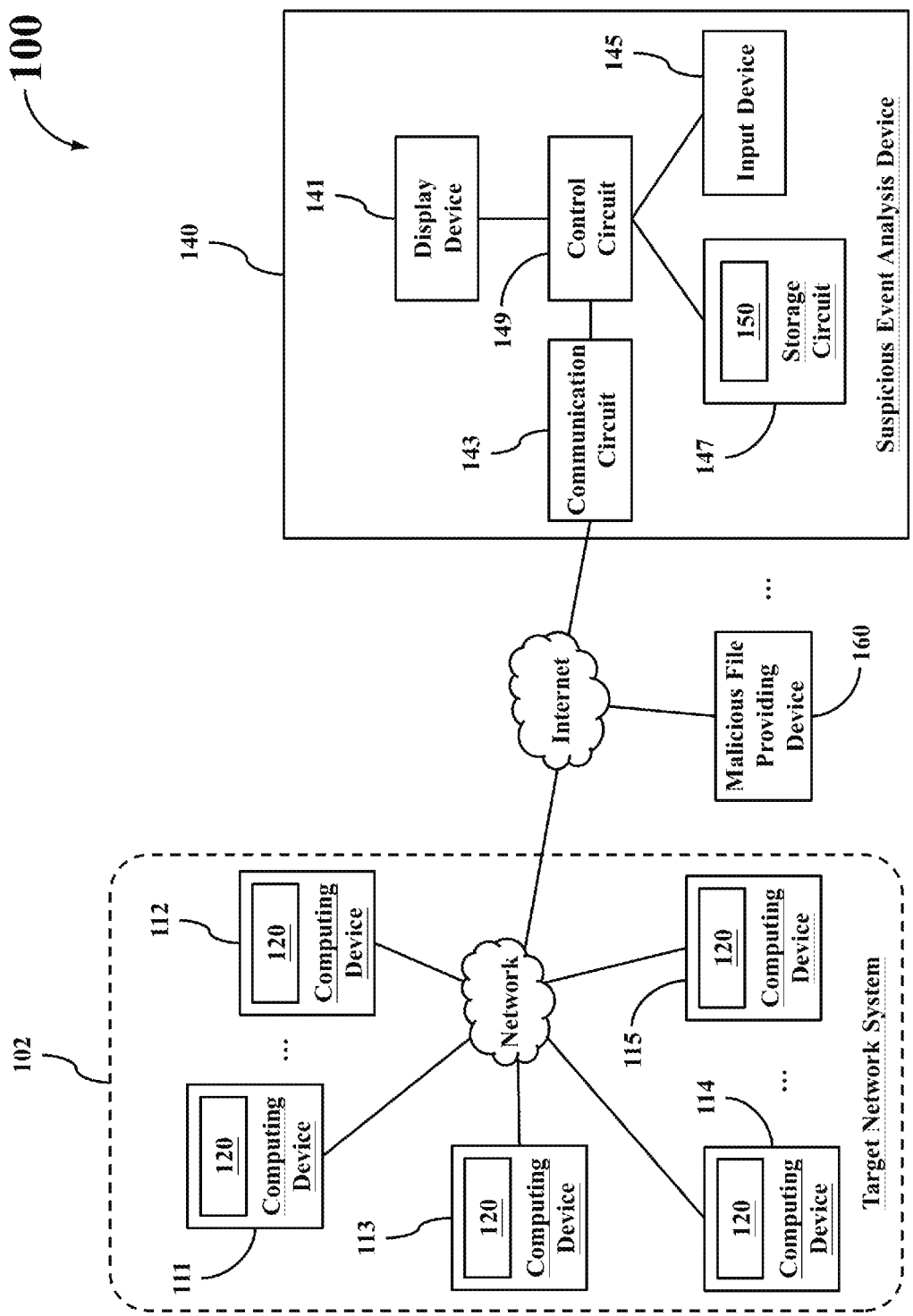
FIG. 13 shows a simplified functional block diagram of the cyber breach diagnostics system according to another embodiment of the present disclosure.

For example, FIG. 13 shows a simplified functional block diagram of the cyber breach diagnostics system 100 according to another embodiment of the present disclosure. In the embodiment of FIG. 13, the activity records collection device 130 in the aforementioned FIG. 1 is omitted, and the operations 408~412, which are originally performed by the activity records collection device 130 may be instead performed by the respective device activities reporting program 120. In other words, in the cyber breach diagnostics system 100 in FIG. 13, the device activities reporting program 120 installed in the respective computing devices processes multiple suspicious activities records, multiple time stamps, and multiple attribute tags to generate the return data, and transmits the return data to the suspicious event analysis device 140 through appropriate networks (e.g., the internet).

The foregoing descriptions regarding the connections, implementations, operations, and related advantages of other components in FIG. 1 are also applicable to the embodiments in FIG. 13. For the sake of brevity, those descriptions will not be repeated here.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A suspicious event analysis device (140) for diagnosing whether a target network system (102) is breached by hackers, the suspicious event analysis device (140) comprising:
   a display device (141);
   a communication circuit (143), arranged to operably receive multiple suspicious activities records related to multiple computing devices (111~115) in the target network system (102), corresponding multiple time stamps, and multiple attribute tags through internet;
   a storage circuit (147), arranged to operably store a suspicious event sequence diagram generating program (150); and
   a control circuit (149), coupled with the display device (141), the communication circuit (143), and the storage circuit (147), and arranged to operably execute the suspicious event sequence diagram generating program (150) to conduct a suspicious event sequence diagram generating operation according to the multiple suspicious activities records, the multiple time stamps, and the multiple attribute tags, so as to identify multiple suspicious events with respect to the target network system (102), identify multiple time records respectively corresponding to the multiple suspicious events, and generate and display a suspicious event sequence diagram (550) corresponding to the multiple suspicious events according to the multiple suspicious events and the multiple time records;

wherein the multiple suspicious events comprise multiple device internal events and multiple device interaction events, while the suspicious event sequence diagram generating operation further comprises:

establishing multiple main visual objects (701~705; 901~909) respectively corresponding to multiple participating devices involving in the multiple suspicious events, wherein at least a part of the multiple main visual objects (701~705; 901~909) corresponds to computing devices of the target network system (102);

horizontally arranging the multiple main visual objects (701~705; 901~909) in an upper area (710) of the suspicious event sequence diagram (550);

establishing multiple vertical patterns (731~735; 931~939) respectively corresponding to the multiple main visual objects (701~705; 901~909);

establishing multiple auxiliary visual objects (741~746; 941~946) respectively corresponding to the multiple device internal events;

establishing multiple relation lines (751~756; 951~956) respectively corresponding to the multiple device interaction events; and arranging the multiple relation lines (751~756; 951~956) according to their chronological order, and rendering two ends of each relation line to respectively touch two vertical patterns corresponding to two involving participating devices.

2. The suspicious event analysis device (140) of claim 1, wherein the suspicious event sequence diagram generating operation further comprises:

respectively arranging the multiple vertical patterns (731~735; 931~939) below the multiple main visual objects (701~705; 901~909);

arranging one or more auxiliary visual objects corresponding to respective participating devices on a vertical pattern below a corresponding main visual object from top to bottom according to a chronological order of corresponding device internal events;

arranging the multiple relation lines (751~756; 951~956) from top to bottom according to their chronological order;

configuring a corresponding orientation symbol (761~766, 961~966) on each relation line according to a content of a device interaction event corresponding to the relation line to indicate an orientation of the device interaction event; and displaying a concise description of a device interaction event corresponding to each relation line.

3. The suspicious event analysis device (140) of claim 2, wherein the suspicious event sequence diagram generating operation further comprises:

repeatedly displaying the multiple main visual objects (701~705; 901~909) in a lower area (720) of the suspicious event sequence diagram (550) according to an identical sequence of the multiple main visual objects (701~705; 901~909) in the upper area (710).

4. The suspicious event analysis device (140) of claim 1, wherein the suspicious event sequence diagram generating operation further comprises:

displaying a concise description of a participating device corresponding to each main visual object; and displaying a concise description of a device internal event corresponding to each auxiliary visual object.

5. The suspicious event analysis device (140) of claim 1, wherein the suspicious event sequence diagram generating operation further comprises:

displaying a corresponding time record of a device internal event corresponding to each auxiliary visual object; and displaying a corresponding time record of a device interaction event corresponding to each relation line.

6. The suspicious event analysis device (140) of claim 1, wherein the suspicious event sequence diagram (550) comprises: a first main visual object (903) corresponding to a first participating device (111), a second main visual object (905) corresponding to a second participating device (112), a first vertical pattern (933) corresponding to the first main visual object (903), and a second vertical pattern (935) corresponding to the second main visual object (905);

wherein when the suspicious event analysis device (140) identifies that a first device internal event took place in the first participating device (111), and a second device internal event took place in the second participating device (112), but whether a device interaction event of a predetermined type took place between the first participating device (111) and the second participating device (112) cannot be confirmed, the suspicious event sequence diagram generating operation further comprises:

calculating a time difference between a first time record corresponding to the first device internal event and a second time record corresponding to the second device internal event;

comparing the time difference with a predetermined threshold value;

establishing a speculated relation line (1157) corresponding to a device interaction event of the predetermined type if the time difference is less than the predetermined threshold value;

rendering two ends of the speculated relation line (1157) to respectively touch the first vertical pattern (933) and the second vertical pattern (935);

configuring a corresponding orientation symbol (1167) on the speculated relation line (1157) according to a relative magnitude of the first time record and the second time record, so as to indicate an orientation of the device interaction event of the predetermined type; and displaying a concise description of the device interaction event of the predetermined type.

7. The suspicious event analysis device (140) of claim 6, wherein both the first device internal event and the second device internal event are file generating events with respect to a same file.

8. The suspicious event analysis device (140) of claim 1, wherein when the multiple participating devices comprise one or more malicious file providing devices (160) located outside the target network system (102), at least a part of the multiple main visual objects (701~705; 901~909) corresponds to the one or more malicious file providing devices (160).

9. A computer program product (150), stored in a storage circuit (147) of a suspicious event analysis device (140), and enabling the suspicious event analysis device (140) to conduct a suspicious event sequence diagram generating operation, the suspicious event sequence diagram generating operation comprising:

identifying multiple suspicious events with respect to the target network system (102) according to multiple suspicious activities records related to multiple computing devices (111~115) in a target network system (102), corresponding multiple time stamps, and multiple attribute tags;

identifying multiple time records respectively corresponding to the multiple suspicious events; and generating and displaying a suspicious event sequence diagram (550) corresponding to the multiple suspicious events according to the multiple suspicious events and the multiple time records;

wherein the multiple suspicious events comprise multiple device internal events and multiple device interaction events, while the suspicious event sequence diagram generating operation further comprises:

establishing multiple main visual objects (701~705; 901~909) respectively corresponding to multiple participating devices involving in the multiple suspicious events, wherein at least a part of the multiple main visual objects (701~705; 901~909) corresponds to computing devices of the target network system (102);

establishing multiple vertical patterns (731~735; 931~939) respectively corresponding to the multiple main visual objects (701~705; 901~909);

establishing multiple auxiliary visual objects (741~746; 941~946) respectively corresponding to the multiple device internal events;

establishing multiple relation lines (751~756; 951~956) respectively corresponding to the multiple device interaction events; and arranging the multiple relation lines (751~756; 951~956) according to their chronological order, and rendering two ends of each relation line to respectively touch two vertical patterns corresponding to two involving participating devices.

10. The computer program product (150) of claim 9, wherein the suspicious event sequence diagram generating operation further comprises:

horizontally arranging the multiple main visual objects (701~705; 901~909) in an upper area (710) of the suspicious event sequence diagram (550);

respectively arranging the multiple vertical patterns (731~735; 931~939) below the multiple main visual objects (701~705; 901~909);

arranging one or more auxiliary visual objects corresponding to respective participating devices on a vertical pattern below a corresponding main visual object from top to bottom according to a chronological order of corresponding device internal events;

arranging the multiple relation lines (751~756; 951~956) from top to bottom according to their chronological order;

configuring a corresponding orientation symbol (761~766, 961~966) on each relation line according to a content of a device interaction event corresponding to the relation line to indicate an orientation of the device interaction event; and displaying a concise description of a device interaction event corresponded by each relation line.

11. The computer program product (150) of claim 10, wherein the suspicious event sequence diagram generating operation further comprises:

repeatedly displaying the multiple main visual objects (701~705; 901~909) in a lower area (720) of the suspicious event sequence diagram (550) according to an identical sequence of the multiple main visual objects (701~705; 901~909) in the upper area (710).

12. The computer program product (150) of claim 9, wherein the suspicious event sequence diagram generating operation further comprises:

displaying a concise description of a participating device corresponding to each main visual object; and displaying a concise description of a device internal event corresponding to each auxiliary visual object.

13. The computer program product (150) of claim 9, wherein the suspicious event sequence diagram generating operation further comprises:

displaying a corresponding time record of a device internal event corresponding to each auxiliary visual object; and displaying a corresponding time record of a device interaction event corresponding to each relation line.

14. The computer program product (150) of claim 9, wherein the suspicious event sequence diagram (550) comprises: a first main visual object (903) corresponding to a first participating device (111), a second main visual object (905) corresponding to a second participating device (112), a first vertical pattern (933) corresponding to the first main visual object (903), and a second vertical pattern (935) corresponding to the second main visual object (905);

wherein when the suspicious event analysis device (140) identifies that a first device internal event took place in the first participating device (111), and a second device internal event took place in the second participating device (112), but whether a device interaction event of a predetermined type took place between the first participating device (111) and the second participating device (112) cannot be confirmed, the suspicious event sequence diagram generating operation further comprises:

calculating a time difference between a first time record corresponding to the first device internal event and a second time record corresponding to the second device internal event;

comparing the time difference with a predetermined threshold value;

establishing a speculated relation line (1157) corresponding to a device interaction event of the predetermined type if the time difference is less than the predetermined threshold value;

rendering two ends of the speculated relation line (1157) to respectively touch the first vertical pattern (933) and the second vertical pattern (935);

configuring a corresponding orientation symbol (1167) on the speculated relation line (1157) according to a relative magnitude of the first time record and the second time record, so as to indicate an orientation of the device interaction event of the predetermined type; and displaying a concise description of the device interaction event of predetermined type.

15. The computer program product (150) of claim 14, wherein both the first device internal event and the second device internal event are file generating events with respect to a same file.

16. The computer program product (150) of claim 9, wherein when the multiple participating devices comprise one or more malicious file providing devices (160) located outside the target network system (102), at least a part of the multiple main visual objects (701~705; 901~909) corresponds to the one or more malicious file providing devices (160).

* * * * *